United States Patent
Campbell et al.

(10) Patent No.: US 10,401,872 B2
(45) Date of Patent: Sep. 3, 2019

(54) METHOD AND SYSTEM FOR COLLISION AVOIDANCE

(71) Applicant: GoPro, Inc., San Mateo, CA (US)

(72) Inventors: Scott Patrick Campbell, Belmont, CA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 135 days.

(21) Appl. No.: 15/603,373

(22) Filed: May 23, 2017

(65) Prior Publication Data

US 2018/0343401 A1    Nov. 29, 2018

(51) Int. Cl.
| | |
|---|---|
| *G06T 7/73* | (2017.01) |
| *G05D 1/10* | (2006.01) |
| *G06K 9/20* | (2006.01) |
| *H04N 5/225* | (2006.01) |
| *G08G 5/00* | (2006.01) |
| *G08G 5/04* | (2006.01) |
| *G06K 9/00* | (2006.01) |
| *H04N 9/04* | (2006.01) |

(52) U.S. Cl.
CPC ......... *G05D 1/101* (2013.01); *G06K 9/00664* (2013.01); *G06K 9/2018* (2013.01); *G06T 7/73* (2017.01); *G08G 5/0021* (2013.01); *G08G 5/0069* (2013.01); *G08G 5/045* (2013.01); *H04N 5/2256* (2013.01); *H04N 5/2258* (2013.01); *H04N 9/04553* (2018.08); *G06T 2207/10016* (2013.01); *G06T 2207/10036* (2013.01); *G06T 2207/10048* (2013.01); *G06T 2207/30252* (2013.01)

(58) Field of Classification Search
None
See application file for complete search history.

(56) References Cited

U.S. PATENT DOCUMENTS

| | | |
|---|---|---|
| 6,512,385 B1 | 1/2003 | Pfaff |
| 8,634,848 B1 | 1/2014 | Bozarth |
| 9,930,307 B1 | 3/2018 | Kursula |

(Continued)

FOREIGN PATENT DOCUMENTS

CN        204946340 U        1/2016

OTHER PUBLICATIONS

Alexander Laskin and Vadim Laskin , "Imaging techniques with refractive beam shaping optics," Proc. SPIE 8490, Laser Beam Shaping XI II, 84900J (Oct. 15, 2012).

*Primary Examiner* — Eileen M Adams
(74) *Attorney, Agent, or Firm* — Young Basile Hanlon & MacFarlane, P.C.

(57) ABSTRACT

An object detection system and method detect objects by projecting an infrared (IR) pattern from an IR emitter and capturing images with respective cameras that each includes an IR channel (e.g., a near IR channel) and one or more visible channels (e.g., red, green, and blue). The object detection system may detect, in the IR channels of the captured images, illumination features (e.g., points, lines, or shapes of IR illumination) from the IR pattern and may also detect objects in the visible channels of the images. The object detection sensor may estimate locations for the objects based on detected illumination features incident upon each object. The object detection system may be part of an aerial vehicle and may be used for autonomous or semi-autonomous flight planning.

17 Claims, 15 Drawing Sheets

(56) References Cited

U.S. PATENT DOCUMENTS

| | | |
|---|---|---|
| 2010/0060885 A1 | 3/2010 | Nobis |
| 2012/0008103 A1 | 1/2012 | Lalley |
| 2012/0154576 A1 | 6/2012 | Weston |
| 2015/0085893 A1 | 3/2015 | Zhang |
| 2016/0328854 A1* | 11/2016 | Kimura .................. G01C 3/08 |
| 2017/0154203 A1 | 6/2017 | Zhao |
| 2017/0224998 A1* | 8/2017 | Gefen .................. A61N 1/3787 |
| 2017/0374332 A1 | 12/2017 | Yamaguchi |
| 2018/0180404 A1* | 6/2018 | Hunt ...................... G01B 11/24 |
| 2018/0204470 A1* | 7/2018 | Rezvani ............... G08G 5/0069 |
| 2018/0249095 A1* | 8/2018 | Lee ......................... H04N 5/33 |
| 2018/0278916 A1 | 9/2018 | Kim |
| 2018/0324399 A1* | 11/2018 | Spears ............... H04N 5/23238 |

\* cited by examiner

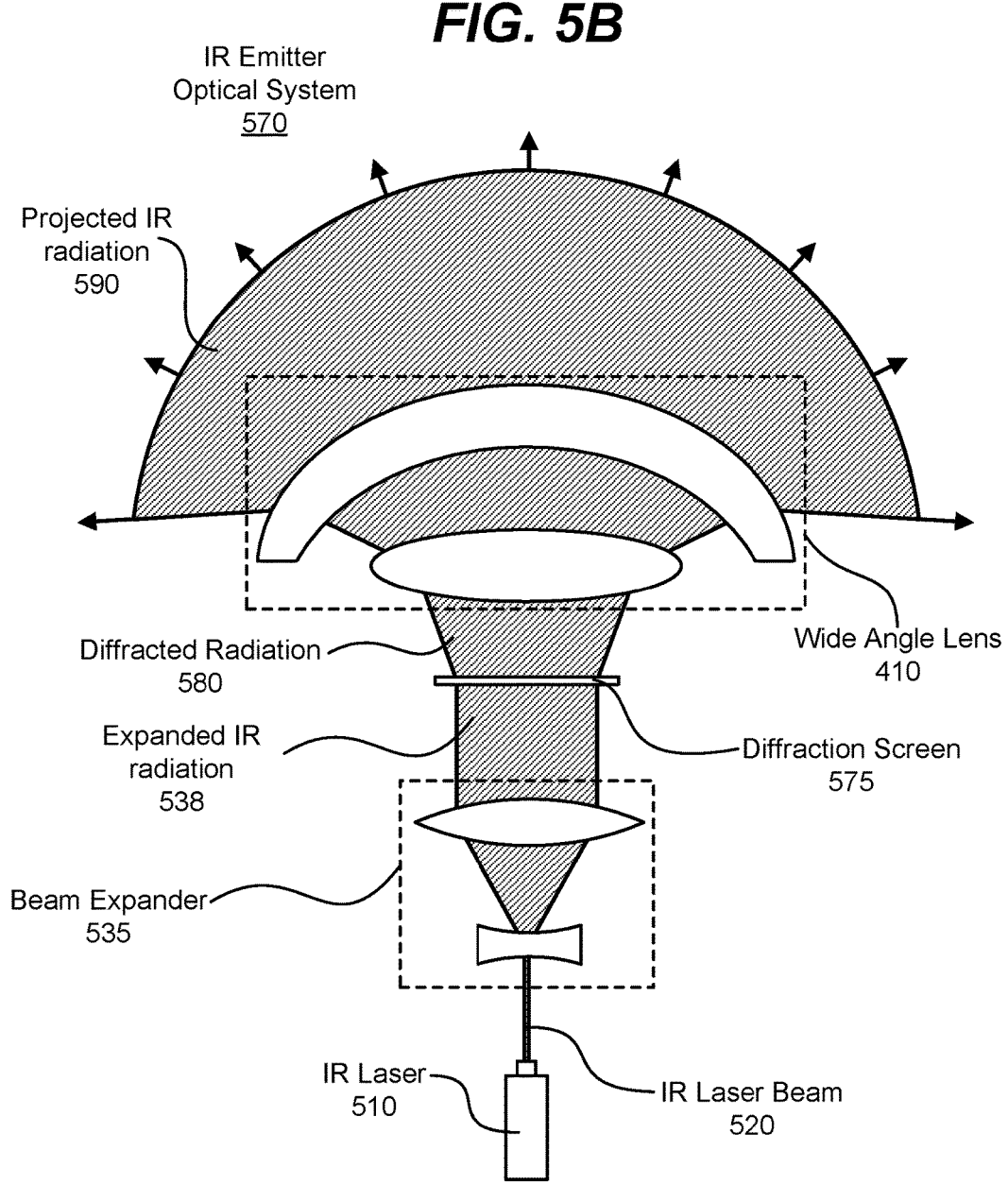

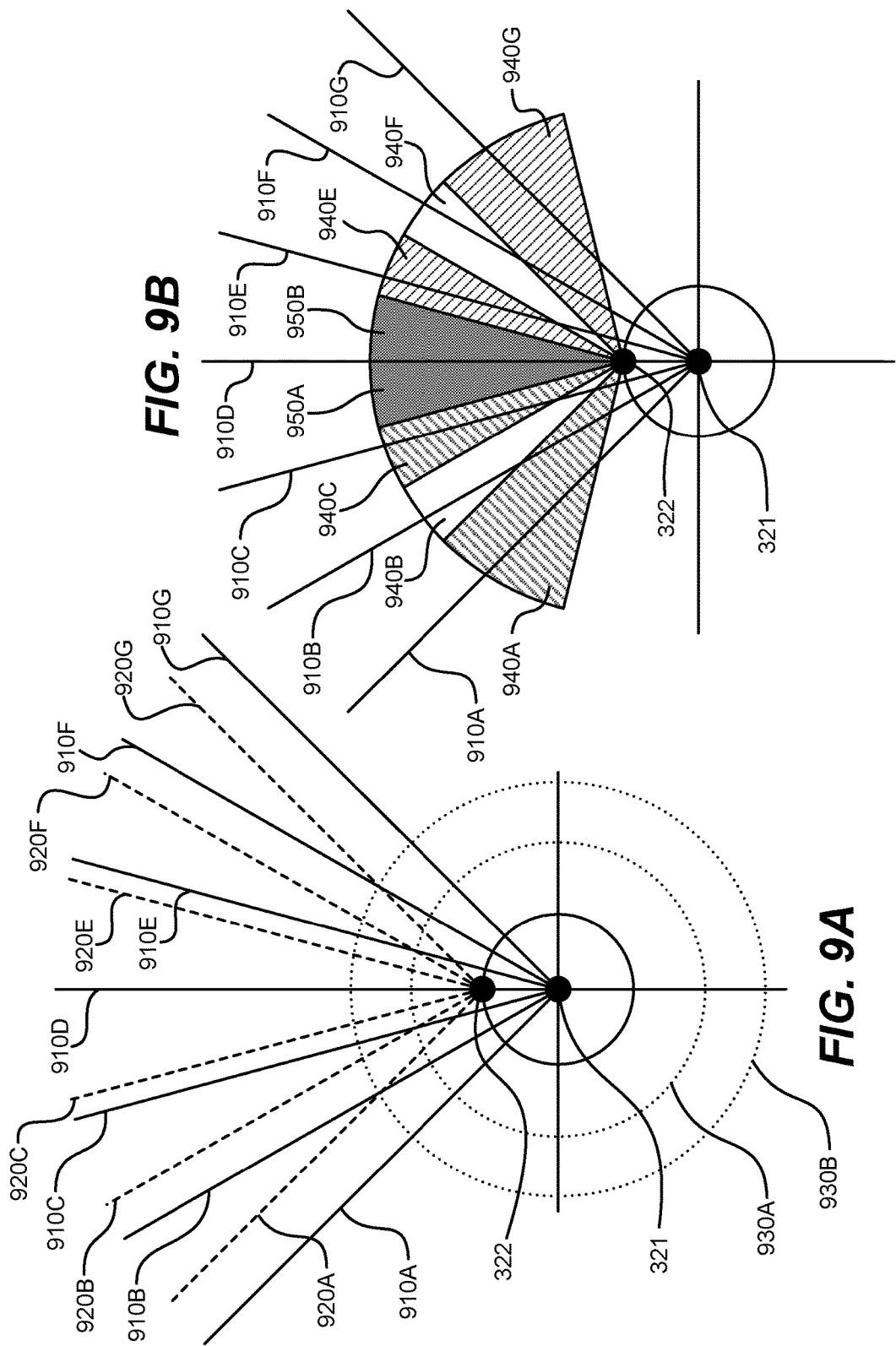

Flight Planning Process
1100

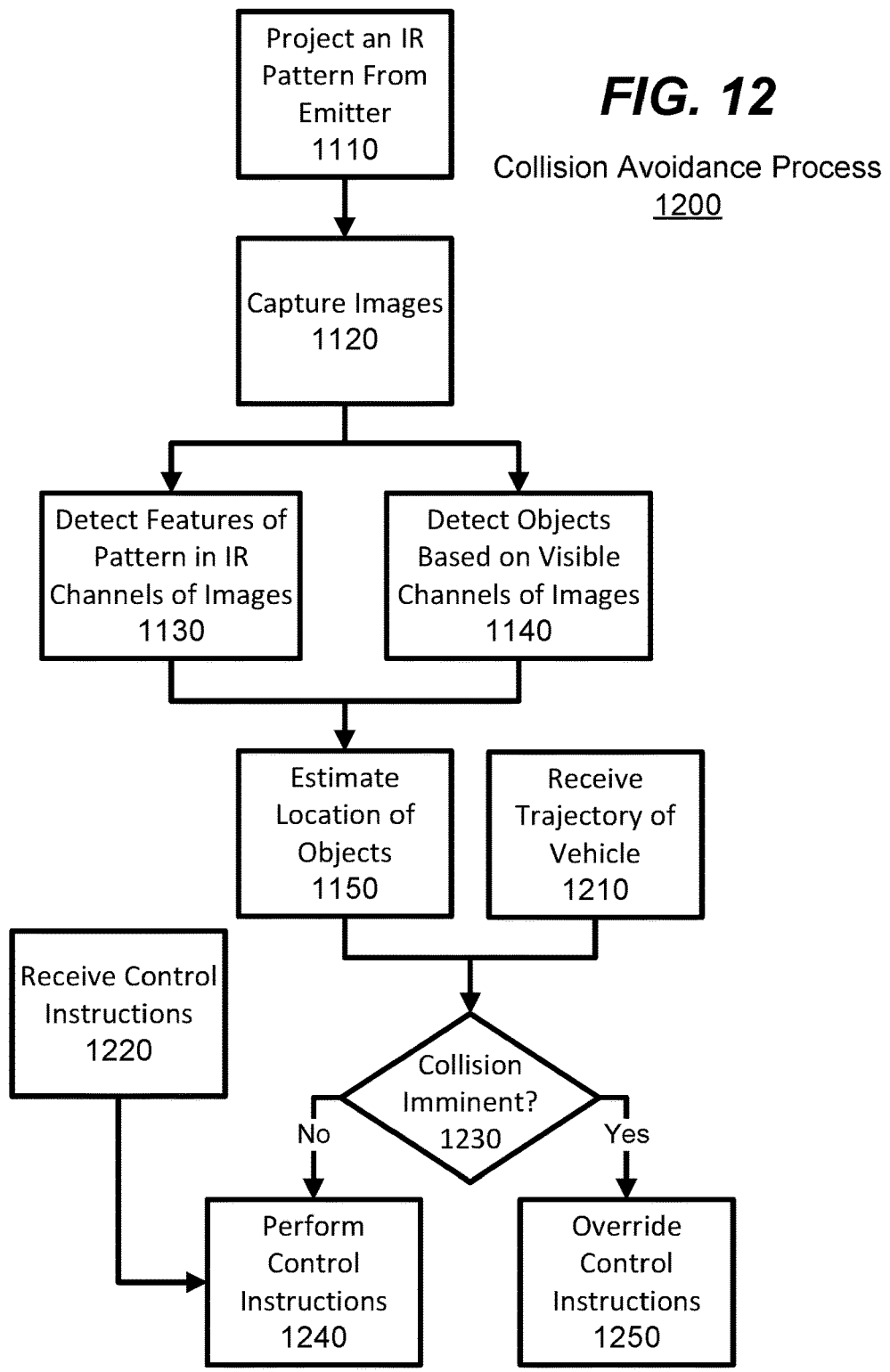

METHOD AND SYSTEM FOR COLLISION AVOIDANCE

BACKGROUND

Field of Art

The disclosure generally relates to the field of active sensor systems and in particular to an active infrared sensor system in an aerial vehicle for collision avoidance.

Description of Art

Unmanned remote control aerial vehicles, such as quadcopters, continue to grow in popularity for both their commercial applications as well as recreational uses by hobbyists. Among other uses, aerial vehicles can enable a user to photograph or record video from a location that would normally be inaccessible (e.g., from an elevated position).

Aerial vehicles are generally susceptible to damage in the event of a collision with an object (e.g., a tree, a building, etc.) in the surrounding environment. The propeller blades of an aerial vehicle may be particularly susceptible to damage due to their light weight and high rate of rotation. Furthermore, collisions frequently cause an aerial vehicle to fall from a significant height, exacerbating the damage sustained by the aerial vehicle. A collision may also cause an aerial vehicle fall into a location from which it is unrecoverable (e.g., into a body of water).

Accordingly, an aerial system equipped with a system for active collision avoidance would be advantageous, especially to hobbyists who may not be experts at controlling an aerial vehicle.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 5B illustrates an example of an optical system in an IR emitter that produces a fixed IR pattern, in accordance with another embodiment.

FIG. 9A illustrates IR beams from an emitter that produce a pattern and a camera that captures the pattern, in accordance with an embodiment.

FIG. 9B illustrates angular regions in the field of view of a camera that may be determined by an IR feature detector to correspond to particular IR beams, in accordance with an embodiment.

FIG. 12 is block diagram of a collision avoidance process for detecting objects and determining whether to perform control instructions in accordance with an embodiment.

DETAILED DESCRIPTION

Figure 1:
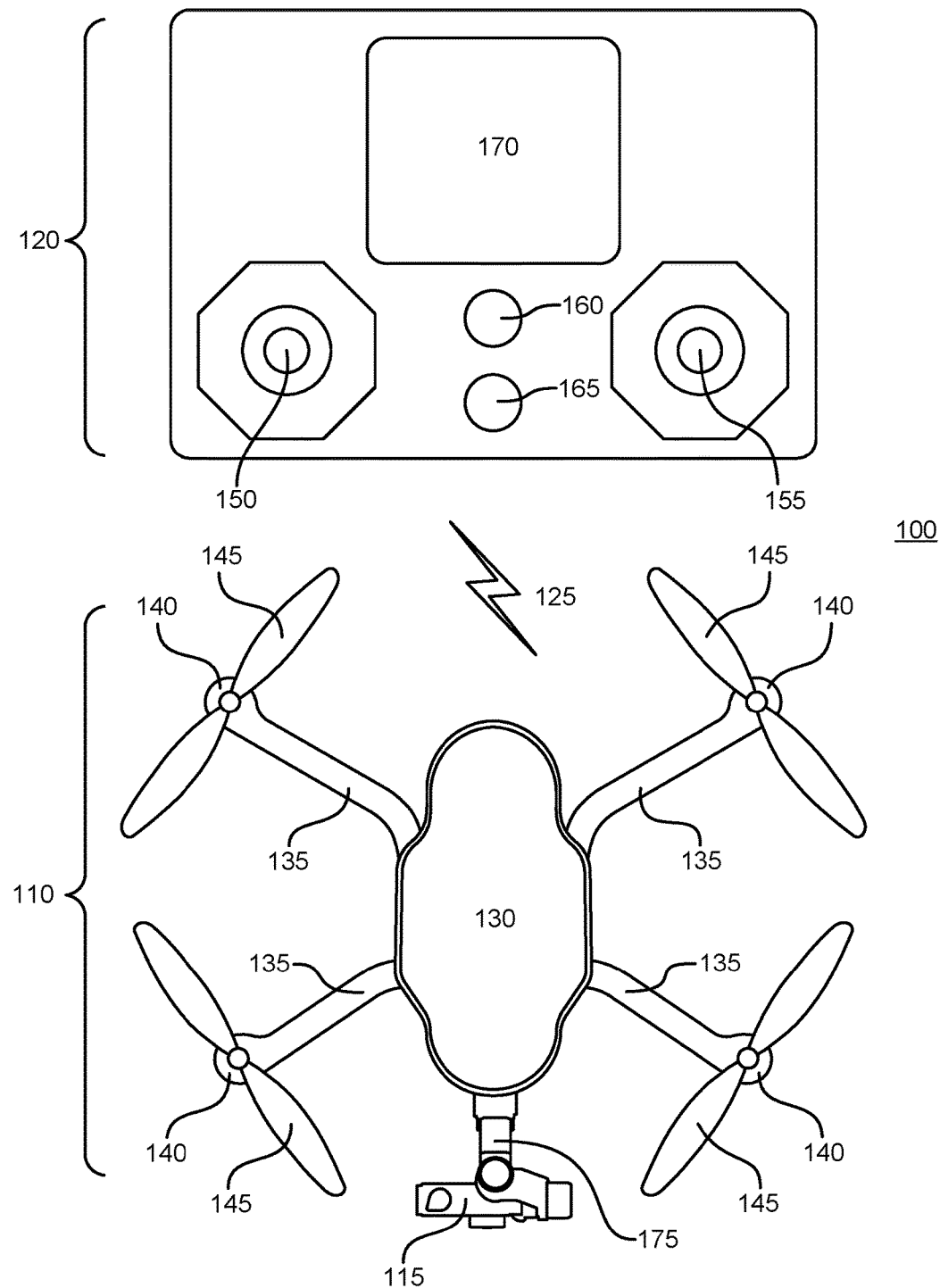
FIG. 1 illustrates a system environment including an aerial vehicle communicating with a remote controller through a wireless network.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an object detection system that projects an IR pattern onto objects and detects the resultant illumination pattern. The object detection system detects objects in its environment (e.g., trees, buildings, people, or any other object) with a set of cameras that detect both the IR illumination pattern and visible light images. The object detection system may detect the illumination pattern based on the IR channels of the image. A vehicle (e.g., an aerial vehicle) may generate a map of objects based on the detected objects and generate a route to fly so as to avoid the detected objects. The vehicle may also override user controls to avoid collisions with detected objects.

The object detection system may detect objects by projecting an IR pattern from an IR emitter and capturing a plurality of images that each includes an IR channel (e.g., a near IR channel) and one or more visible channels (e.g., red, green, and blue). The IR pattern may have a narrow bandwidth. The IR pattern may be in the near IR (e.g., 1382 nm). The object detection system may detect, in the IR channels of the captured images, illumination features (e.g., points, lines, or shapes of IR illumination) from the IR pattern and may also detect objects in the visible channels of the images.

The object detection sensor may estimate locations for the objects based on detected illumination features incident upon each object.

An object detection sensor that projects and detects an IR pattern and detects visible objects may provide for more robust object detection than either active IR detection or passive visual detection in isolation. For example, in situations when passive visible object detection is not reliable, the object detection sensor can still detect objects with the IR detection. Situations in which passive visible object detection sensors cannot reliably detect an object may include low light scenarios (e.g., during the night or at dusk), detecting objects near the direction of the sun or another bright light source where a visible light image detector may become saturated, and detecting objects in dark areas (e.g., in a shadow) in an otherwise bright scene.

By detecting visible light and detecting objects based on the visible light channels, the object detection system may associate illumination features together by determining that the illumination features are incident on the same object. In some embodiments, the image sensors of the cameras are fused IR and visible light image sensors with subpixel layouts that include visible light subpixels and IR subpixels. In such an embodiment, the object detection system can unambiguously associate illumination features and visual objects.

Example Aerial Vehicle System

FIG. 1 illustrates a system environment 100 that includes an aerial vehicle 110 communicating with a remote controller 120 through a wireless network 125. The aerial vehicle 110 in this example is shown with a housing 130 and arms 135 of an arm assembly. In addition, this example embodiment shows a thrust motor 140 coupled with the end of each arm 135 of the arm assembly, a gimbal 175, and a gimbal camera 115. Each thrust motor 140 may be coupled to a propeller 145. The thrust motors 140 may spin the propellers 145 when the motors are operational.

The aerial vehicle 110 may communicate with the remote controller 120 through the wireless network 125. The remote controller 120 may be a dedicated remote control device or may be another computing device such as a laptop, smartphone, or tablet that is configured to wirelessly communicate with and control the aerial vehicle 110. In one embodiment, the wireless network 125 may be a long range Wi-Fi system. It also may include or be another wireless communication system, for example, one based on long term evolution (LTE), 3G, 4G, or 5G mobile communication standards. In place of a single wireless network 125, a unidirectional RC channel may be used for communication of controls from the remote controller 120 to the aerial vehicle 110 and a separate unidirectional channel may be used for video downlink from the aerial vehicle 110 to the remote controller 120 (or to a video receiver where direct video connection may be desired).

The remote controller 120 in this example may include a first control panel 150 and a second control panel 155, an ignition button 160, a return button 165 and a screen 170. A control panel, e.g., the first control panel 150, may be used to control "up-down" direction (e.g. lift and landing) of the aerial vehicle 110. Another control panel, e.g., the second control panel 155, may be used to control the forward, reverse, and lateral directions of the aerial vehicle 110. Each control panel 150, 155 may be structurally configured as a joystick controller and/or touch pad controller. The ignition button 160 may be used to start the rotary assembly (e.g., start the propellers 145). The return button 165 may be used to override the controls of the remote controller 120 and transmit instructions to the aerial vehicle 110 to return to a predefined location. The ignition button 160 and the return button 165 may be mechanical and/or solid state press sensitive buttons. In addition, each button may be illuminated with one or more light emitting diodes (LED) to provide additional details. For example the LED may switch from one visual state to another to indicate with respect to the ignition button 160 whether the aerial vehicle 110 is ready to fly (e.g., lit green) or not (e.g., lit red) or whether the aerial vehicle 110 is now in an override mode on return path (e.g., lit yellow) or not (e.g., lit red). The remote controller 120 may include other dedicated hardware buttons and switches and those buttons and switches may be solid state buttons and switches. The remote controller 120 may also include hardware buttons or other controls that control the gimbal 175. The remote controller 120 may allow it's user to change the preferred orientation of the gimbal camera 115. In some embodiments, the preferred orientation of the gimbal camera 115 may be set relative to the angle of the aerial vehicle 110. In another embodiment, the preferred orientation of the gimbal camera 115 may be set relative to the ground.

The remote controller 120 also may include a screen 170 (or display) which provides for visual display. The screen 170 may be a touch sensitive screen. The screen 170 also may be, for example, a liquid crystal display (LCD), an LED display, an organic LED (OLED) display or a plasma screen. The screen 170 may allow for display of information related to the remote controller 120, such as menus for configuring the remote controller 120 or remotely configuring the aerial vehicle 110. The screen 170 also may display images or video captured from the gimbal camera 115 coupled with the aerial vehicle 110, wherein the images and video are transmitted via the wireless network 125. The video content displayed by on the screen 170 may be a live feed of the video or a portion of the video captured by the gimbal camera 115. For example, the video content displayed on the screen 170 may be presented within a short time (preferably fractions of a second) of being captured by the gimbal camera 115.

The video may be overlaid and/or augmented with other data from the aerial vehicle 110 such as the telemetric data from a telemetric subsystem of the aerial vehicle 110. The telemetric subsystem may include navigational components, such as a gyroscope, an accelerometer, a compass, a global positioning system (GPS), and/or a barometric sensor. In one example embodiment, the aerial vehicle 110 may incorporate the telemetric data with video that is transmitted back to the remote controller 120 in real time. The received telemetric data may be extracted from the video data stream and incorporate into predefine templates for display with the video on the screen 170 of the remote controller 120. The telemetric data also may be transmitted separately from the video from the aerial vehicle 110 to the remote controller 120. Synchronization methods such as time and/or location information may be used to synchronize the telemetric data with the video at the remote controller 120. This example configuration allows a user, e.g., operator, of the remote controller 120 to see where the aerial vehicle 110 is flying along with corresponding telemetric data associated with the aerial vehicle 110 at that point in the flight. Further, if the user is not interested in telemetric data being displayed real-time, the data can still be received and later applied for playback with the templates applied to the video.

The predefined templates may correspond with user-interface "gauges" that provide a visual representation of speed, altitude, and charts, e.g., as a speedometer, altitude chart, and a terrain map. The populated templates, which may appear as gauges on a screen 170 of the remote controller 120, can further be shared, e.g., via social media, and/or saved for later retrieval and use. For example, a user may share a gauge with another user by selecting a gauge (or a set of gauges) for export. Export can be initiated by clicking the appropriate export button, or a drag and drop of the gauge(s). A file with a predefined extension will be created at the desired location. The gauge to be selected and be structured with a runtime version of the gauge or can play the gauge back through software that can read the file extension.

Example Aerial Vehicle Configuration

Figure 2:
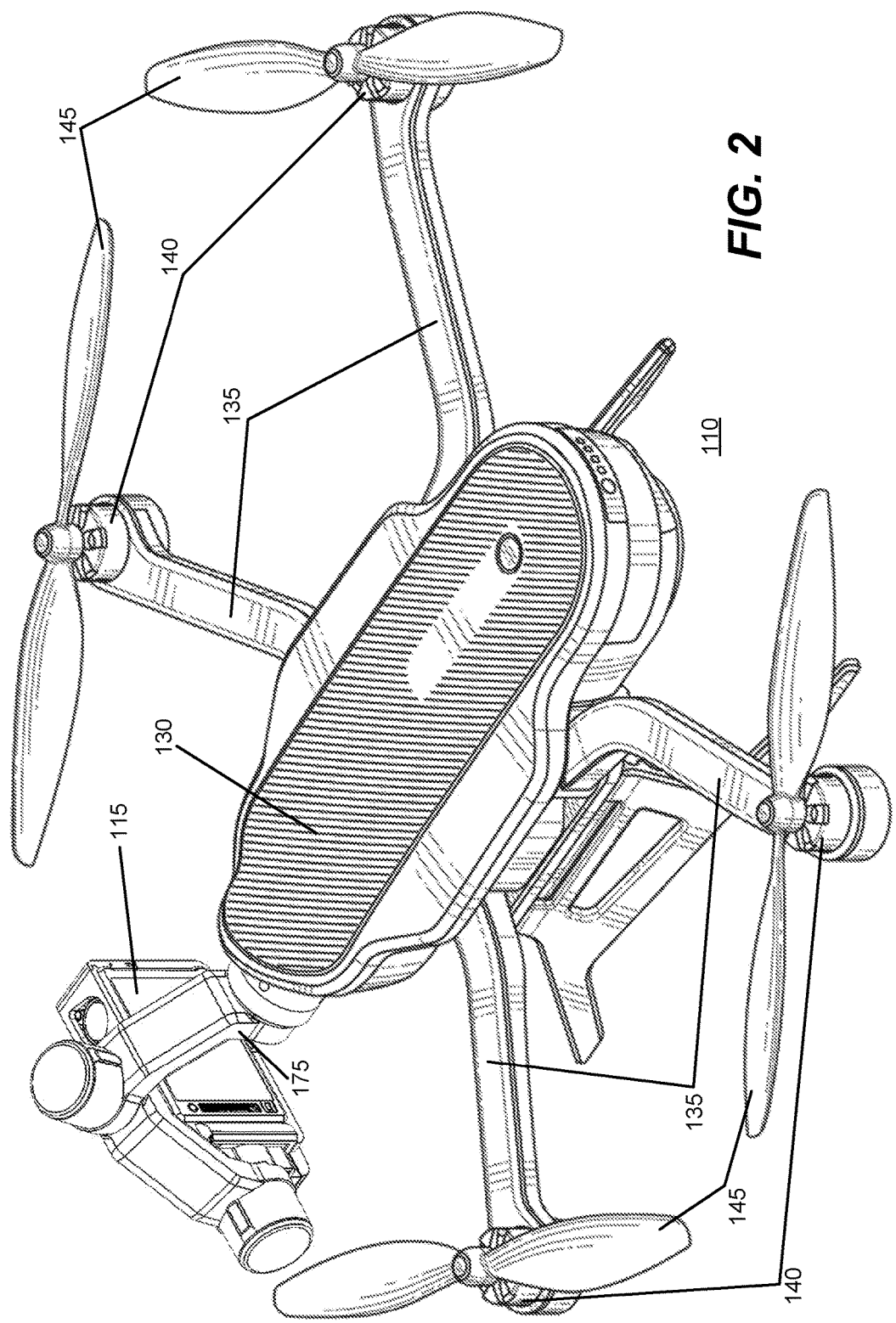
FIG. 2 illustrates an example embodiment of the aerial vehicle.

FIG. 2 illustrates an example embodiment of the aerial vehicle 110. The aerial vehicle 110 in this example includes housing 130 for a payload (e.g., electronics, storage media, and/or camera), four arms 135, four thrust motors 140, and four propellers 145. Each arm 135 mechanically couples with a thrust motor 140 to create a rotary assembly. When the rotary assembly is operational, all the propellers 145 spin at appropriate speeds to allow the aerial vehicle 110 to lift (take off), land, hover, move (e.g., and forward, backward), and rotate in flight. Modulation of the power supplied to each of the thrust motors 140 can control the trajectory and torque on the aerial vehicle 110.

The gimbal 175 may be coupled to the housing 130 of the aerial vehicle 110 through a removable coupling mechanism that mates with a reciprocal mechanism on the aerial vehicle 110 having mechanical and communicative capabilities. In some embodiments, the gimbal 175 may be attached or removed from the aerial vehicle 110 without the use of tools. The gimbal 175 controls the position and/or orientation of the gimbal camera 115. In some embodiments, the gimbal camera 115 is removable from the gimbal 175.

Example System Configuration

Figure 3:
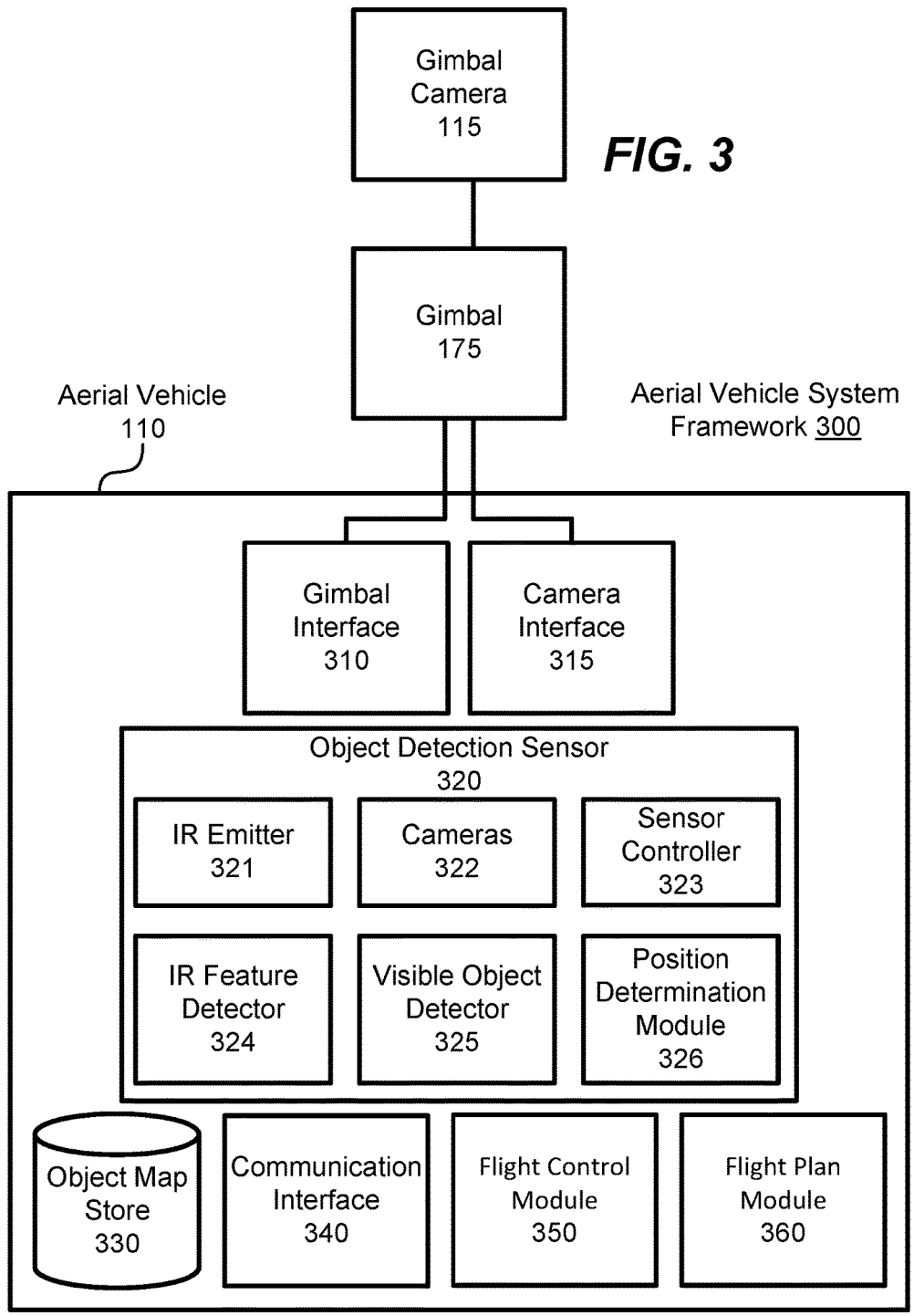
FIG. 3 is a functional block diagram illustrating an example system framework of an aerial vehicle coupled to a gimbal and a camera.

FIG. 3 is a functional block diagram illustrating an example system framework 300 of an aerial vehicle 110 coupled to a gimbal 175 and a gimbal camera 115. In this example, the aerial vehicle system framework 300 includes a gimbal camera 115 mounted on a gimbal 175 which is coupled to an aerial vehicle 110. The coupling between the gimbal 175 and the aerial vehicle 110 may include a mechanical coupling and a communicative coupling.

The gimbal camera 115 may include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. The gimbal camera 115 may capture images and videos at various frame rates, resolutions, and compression rates.

The gimbal 175 is, in some embodiments, an electronic three-axis gimbal which rotates a mounted object (e.g., the gimbal camera 115) in space. Sensors and control logic in the gimbal 175 may detect the orientation of the gimbal 175 and the gimbal camera 115, determine a preferred orientation of the gimbal camera 115, and control the motors of the gimbal 175 in order to re-orient the gimbal camera 115 to the preferred position.

The gimbal camera 115 may be enclosed or mounted to a detachable camera frame. The detachable camera frame may include electronic connectors which can couple with the gimbal camera 115. The detachable camera frame may include, for example, a micro USB connector, which can provide power to the gimbal camera 115 and can allow the aerial vehicle 110 to send executable instructions to the gimbal camera 115, such as a command to change the frame rate of a video or a command to take a picture. An HDMI connector on the camera frame may allow the gimbal camera 115 to transmit captured video, audio, and images to the aerial vehicle 110. The detachable camera frame may include any set of connectors and utilize any communication protocols to transmit data to and from the aerial vehicle 110. The detachable camera frame may include a set of connectors (not shown) which connect to the gimbal 175, so that the gimbal 175 can act as a bus for transmitting data or power between the aerial vehicle 110 and the gimbal camera 115, and vice versa.

The aerial vehicle 110 includes a gimbal interface 310, a camera interface 315, an object detection sensor 320, a map store 330, a communication interface 340, a flight control module 350, and a flight plan module 360. The modules of the aerial vehicle 110 may be software modules (e.g., code embodied on a machine-readable storage medium or in a transmission signal). The software code may be executed by one or more processors of the aerial vehicle 110.

The gimbal interface 310 includes software and hardware interfaces for controlling the gimbal 175. The gimbal interface 310 also provides power to the gimbal 175. A gimbal controller on the aerial vehicle 110 may use this data to adjust the gimbal camera 115. The gimbal interface 310 may set a position for each motor of the gimbal 175 and/or determine a current position for each motor of the gimbal 175 based on signals received from one or more rotary encoders.

The camera interface 315 includes software and hardware interfaces for controlling the gimbal camera 115 and for receiving images and video from the gimbal camera 115. Media captured by the gimbal camera 115 (e.g., still images, video, and/or audio) may be communicated to the aerial vehicle 110 through the camera interface 315. Data (e.g., telemetric data from a sensor subsystem of the aerial vehicle 110) also may be sent via the camera interface 315 to the gimbal camera 115 to associate with video captured and stored on the gimbal camera 115. The camera interface 315 may control the interface with the camera through one or more busses included in the gimbal 175.

The camera interface 315 may send instructions via the gimbal 175 to the gimbal camera 115. Instructions may include a command to toggle the power of the gimbal camera 115, a command to begin recording video, a command to stop recording video, a command to take a picture, a command to take a burst of pictures, a command to set the frame rate at which a video is recording, or a command to set the picture or video resolution. The camera interface 315 may also send an instruction to the gimbal camera 115 to include a metadata tag in a recorded video or in a set of pictures. In this example configuration, the metadata tag contains information such as a geographical location or a time. For example, the aerial vehicle 110 can send a command through the gimbal 175 to record a metadata tag while the gimbal camera 115 is recording a video. When the recorded video is later played, certain media players may be configured to display an icon or some other indicator in association with the time at which the command to record the metadata tag was sent. For example, a media player might display a visual queue, such as an icon, along a video timeline, wherein the position of the visual queue along the timeline is indicative of the time. The metadata tag may also instruct the gimbal camera 115 to record a location, which can be obtained via a GPS (Global Positioning Satellite) receiver located on the aerial vehicle 110 or the gimbal camera 115, in a recorded video. Upon playback of the video, the metadata can be used to map a geographical location to the time in a video at which the metadata tag was added to the recording.

The object detection sensor 320 is an active sensor that emits a pattern of IR radiation which is incident on objects in the surrounding environment. The illumination of the objects by the IR radiation is detected by the object detection sensor 320, which determines position data for the objects. The object detection sensor includes an IR emitter 321, cameras 322, a sensor controller 323, an IR feature detector 324, a visible object detector 325, and a position determination module 326.

The IR emitter 321 projects an IR pattern onto the surrounding environment. The IR pattern may be, in some embodiments, in the near infrared (NIR) spectrum. In some embodiments, the IR radiation of the IR pattern is concentrated in a narrow frequency band. In some embodiments, the IR emitter 321 sweeps one or more narrow IR beams (e.g., an IR laser beam) through one or more angular paths to produce the IR pattern. That is, the IR emitter 321 may project an IR pattern by producing one or more narrow IR beams and changing the directions of the one or more IR beams over time. For example, the IR emitter 321 may trace the one or more angular paths of the IR pattern during a time period of 0.1 seconds to 1 millisecond. The IR emitter 321 may emit the IR pattern continuously or with a duty cycle (e.g., a duty cycle greater than or equal to 0.1%).

The IR emitter 321 may produce an IR pattern that covers the entire plane of horizontal angles, save for relatively small angular gaps in the IR pattern. In some embodiments, the IR pattern covers the entire sphere of solid angles (i.e., 4π steradians), save for relatively small angular gaps in the IR pattern. The IR pattern produced by the IR emitter 321 may include one or more pattern features. A pattern feature is a portion of the IR radiation projected by the IR emitter 321, such as an angular path of the IR emitter 321. A pattern feature may be, for example, a circle, a polygon, a line segment, or some other shape, as defined in spherical geometry. A pattern feature may be projected onto an object (e.g., a tree) to produce an illumination feature. An illumination feature may be a two-dimensional bright spot or shape that corresponds to distorted pattern feature. The IR emitter 321 is further described below in conjunction with the description of FIGS. 5A and 5B.

The object detection sensor 320 also includes cameras 322. Each camera 322 may include one or more lenses, an image sensor, and an image processor. In some embodiments, the cameras 322 may have fixed-focus lenses. The image sensor of each camera 322 may capture high-definition images having a resolution of, for example, 820p, 1080p, 4k, or higher. The image processor of each camera 322 may perform one or more image processing functions of the captured images or video. For example, the image processor may perform demosaicing, noise reduction, image sharpening, image stabilization, rolling shutter artifact reduction, color space conversion, compression, or other in-camera processing functions.

The cameras 322 detect the IR pattern projected by the IR emitter 321 onto objects in the environment of the object detection sensor 320. The cameras 322 may be configured to captured images in the IR spectrum (e.g., a portion of the NIR spectrum). A camera 322 may capture images with an exposure time sufficient for the IR emitter 321 to sweep through the IR pattern or a portion of the IR pattern. In some embodiments, the cameras 322 capture images as fused images having one or more channels corresponding to the visible spectrum (e.g., a red channel, a green channel, and a blue channel) and one or more channels corresponding to the NIR spectrum.

In some embodiments, the cameras 322 are positioned so that at least one camera captures every horizontal angle around the aerial vehicle 110 so that the cameras 322 have a composite 360° field of view. In some embodiments, the cameras 322 are positioned so as to capture nearly every horizontal and vertical angle around the aerial vehicle so that the cameras 322 have a composite spherical field of view.

The sensor controller 323 controls the IR emitter 321 and/or the cameras 322. The sensor controller 323 may include one or more hardware interfaces for controlling the IR pattern produced by the IR emitter 321. The sensor controller 323 may include one or more interfaces to send instructions to each of the cameras 322 to capture respective images. The sensor controller 323 receives the captured images from each of the cameras 322. The sensor controller 323 may control the cameras 322 so that the exposure time period while capturing an image corresponds to the time period that the IR emitter 321 produces the IR pattern.

The IR feature detector 324 detects the illumination features of the IR pattern produced by the IR emitter 321 in the images captured by the cameras 322. In a captured image, an illumination feature is a portion of the IR channel of the image corresponding to illumination caused by the IR pattern incident on some object in the environment of the aerial vehicle 110. An illumination feature in a captured image may appear as a two-dimensional (e.g., circles or other shapes), one-dimensional (e.g., lines or curves), or zero-dimensional (e.g., points) illumination detected in the IR channel of the image.

The IR feature detector 324 may match together illumination features in multiple images corresponding to different cameras 322. The IR feature detector 324 may match illumination features in a set of captured images by matching portions illumination features in different images that correspond to the same pattern feature. In some embodiments, determining the pattern feature that an illumination feature corresponds to may be based on the visible channel of the image in the area of the feature. For example, if two detected illumination features captured in respective images by respective cameras 322 have respective portions in the area of the illumination features that are similar in the visible channels, the IR feature detector 324 may determine that the illumination features correspond to the same pattern features. The IR feature detector 324 may determine that the portions are similar if they have similar hues, similar brightness, similar textures, and/or some other visual similarity.

The IR feature detector 324 also may determine the illumination feature's angular position, with respect to a camera that captured the illumination feature. The IR feature detector 324 may determine an angular position of an illumination feature by applying a mapping function to the pixel location of the illumination feature. In some embodiments, IR feature detector 324 may determine multiple angular positions or a range of angular positions for a single illumination feature.

The IR feature detector 324 may also determine the pattern feature emitted by the IR emitter 321 to which detected illumination feature corresponds. For example, if the IR feature detector 324 emits a series of vertical lines, the IR feature detector 324 may receive images including distorted vertical lines of illumination and may determine which vertical line in the image (the illumination feature) corresponds to which of the emitted vertical lines (the pattern feature). Matching emitted pattern features to detected illumination is described further below in conjunction with FIGS. 9A-9B and FIGS. 10A-10C.

The visible object detector 325 uses the visible channels (e.g., the red, green, and blue channels) of the images captured by the cameras 322 to detect visible objects. The visible object detector 325 may implement one or more object classifiers, such as, a classifier configured to recognize common objects encountered by an aerial vehicle 110 (e.g., trees, building, etc.) or a generic object classifier. In some embodiments, the visible object detector 325 detects visible objects via image segmentation without classifying them. In some embodiments, once a visible object is first detected, the visible object detector 325 may track the visible object with a video tracking algorithm. The visible object detector 325 may detect visible objects that correspond to objects illuminated by the IR emitter 321. The visible object detector 325 may determine the depth of a visible object detected by two cameras 322 based on stereo video depth estimation.

The position determination module 326 may determine position data for objects upon which the IR pattern is incident. Position data may include a single position (e.g., a single x-y-z coordinate), a set of positions, a volumetric shape, or any other type of spatial information, in accordance with various embodiments. The amount of position data for an object determined by the position determination module 326 may depend on, for example, the distance between the object the object detection sensor 320, the number of illumination features incident on the object, and/or the number of cameras 322 that detect the object. The position determination module 326 may update position data for an object that was previously updated based on newly detected images so as to iteratively update position data.

The position determination module 326 may determine the position data based on illumination features detected from the IR pattern and detected visible objects. In some embodiments, the position determination module 326 associates multiple illumination features together by determining, based on the visible objects detected by the visible object detector 325, that the illumination features are incident on the same object. The visible object detector 325 may perform image segmentation to divide a visible channel image into a set of segments, and the illumination features detected by the IR feature detector 324 that lie in a segment (i.e., a bounded area of pixels) may be detected. For example, an image that includes a tree may be segmented, and the illumination features that have pixel locations or angular positions within the bounds of the segment corresponding to the tree may be identified as being part of the same object (i.e., the tree).

The position determination module 326 may determine position data for an object with an illumination feature incident upon based on the angular position of the illumination feature relative to the camera compared to the angle, or range of angles, that the pattern feature is projected from the IR emitter 321. For example, suppose a pattern feature (e.g., a vertical line) is projected from the IR emitter 321 with an angle A on the horizontal plane. The illumination feature corresponding to the pattern feature is detected by a camera 322 with a horizontal angular position of B. If the horizontal displacement of the camera 322 from the IR emitter 321 is d with an horizontal angle of displacement C, then a horizontal position (x,y) for the object, relative to the IR emitter 321, with the illumination feature can be determined by solving the following system of equations:

$$\tan(A) = \frac{y}{x} \quad (1)$$

$$\tan(B) = \frac{y - d \times \sin(C)}{x - d \times \cos(C)} \quad (2)$$

The position determination module 326 may also determine position data for an object based on the change of an illumination feature in multiple frames captured by the same camera (e.g., by measuring motion parallax). Motion parallax may be compared to the velocity of the aerial vehicle 110 as detected sensors on the aerial vehicle 110 (e.g., an inertial measurement unit (IMU) or a GPS receiver). The position determination module 326 may determine position data for an object based on the brightness of an illumination feature incident upon it. The position determination module 326 may also determine the position data of an object based on the size (e.g., thickness, length, width, and/or area) of an illumination feature incident on it.

The position determination module 326 also may determine position data for an object based on multiple illumination features appearing in multiple images (e.g., cotemporal images) captured by respective cameras 322 that correspond to the same pattern feature of the IR pattern. Position data for the object may be determined based on a comparison between the angular positions of the illumination features in two or more images captured by respective spatially-separated cameras 322. That is, the position determination module 326 may determine the position data for an object based on parallax in images compared to the spatial displacement between the cameras 322 that captured the images. For example, the position determination module 326 may determine the position of an object with a stereo depth estimation algorithm. Determining position data for an object based on multiple captured images is described further below in conjunction with FIGS. 10A-10C.

The position determination module 326 may also determine the position of an object based on visible objects detected by the cameras 322. The position of a visible object may be determined with stereo image depth estimation based on images captured by two spatially separated cameras 322. In some embodiments, a position determined for an object based on the visible channels and a position determined for features incident on the object may be combined (e.g., averaged together) to determine the position of the object.

The position determination module 326 may produce a map of objects. The map of objects may be a 3-dimensional map storing each object detected by the object detection sensor 320 with the associated positions determined by the object determination module 326. The map of objects may include the detected objects mapped on a single coordinate system. The position determination module 326 may associate multiple positions with an object (e.g., if multiple illumination features are on the object) and/or a range of positions (e.g., if an illumination feature has extension, such as a line or a 2-dimensional shape). In some embodiments, the position determination module 326 may update an object map iteratively, so that the resolution of the map is iteratively improved. For example, the position determination module 326 may determine the shape of an object based on an aggregation of a multiplicity of observations. In some embodiments, the object map is based on a topographical map stored on the aerial vehicle 110 and the detected objects are added to the object map.

The object map store 330 stores a 3-dimensional map of the objects in the environment of the aerial vehicle 110. The object map store 330 is a memory (e.g., a non-volatile computer readable storage medium, a random access memory (RAM), or some combination thereof) or part of a memory on the aerial vehicle 110. The map of objects may be generated by the object detection sensor 320 (e.g., by the position determination module 326). In some embodiments, the objects in the object map are classified by the visible object detector 325. For example, an object may be classified as a tree, a building, etc.

The communication interface 340 controls wireless communication with one or more external devices, such as the remote controller 120. The communication interface 340 may receive and/or transmit signals via the wireless network 125. The communication interface 340 includes one more antennas for sending information to the remote controller 120 (e.g., GPS coordinates of the aerial vehicle 110, compass orientation of the aerial vehicle 110, images captured by the gimbal camera 115, video captured by the gimbal camera 115, error messages indicating mechanical or electronic failure of components of the aerial vehicle 110, or the positions of objects detected by the object detection sensor 320). The communication interface 340 also receives information from the remote controller 120 such as instructions for controlling the trajectory of the aerial vehicle 110 or controlling the gimbal camera 115. In one embodiment, the communication interface 340 may communicate via a long-range Wi-Fi system. It also communicate through or be another wireless communication system, for example, one based on long term evolution (LTE), 3G, 4G, and/or 5G mobile communication standards. The communication interface 340 also may be configured with a unidirectional RC channel for communication of instructions from the remote controller 120 to the aerial vehicle 110 and a separate unidirectional channel for video downlink from the aerial vehicle 110 to the remote controller 120.

The flight control module 350 may receive control instructions from the remote controller 120 via the communication interface 340. The control instructions may be, for example, generated via the control panels 150, 155 of the remote controller 120. The flight control module 350 may manipulate the appropriate electrical and mechanical subsystems of the aerial vehicle 110 to carry out the received control instructions. The flight control module 350 may control the thrust motors 140 to control the trajectory and orientation of the aerial vehicle 110 based on the received control instructions. The flight control module 350 may also implement one or more control algorithms to stabilize the aerial vehicle 110.

In some embodiments, when the flight control module 350 determines that the aerial vehicle 110 is likely to imminently collide with an object detected by the object detection sensor 320, the flight control module 350 may override user control of the aerial vehicle 110 to avoid collision. For example, if the current trajectory of the aerial vehicle 110 is in the direction of a nearby tree detected by the object detection sensor 320, the flight control module 350 may override the control instructions received from the remote controller 120 and perform a maneuver to avoid colliding with the tree. The flight control module 350 may override the control instructions and stop, reverse course, or swerve to avoid a detected object. After avoiding a collision, the flight control module 350 may stop overriding control instructions and resume manual control of the aerial vehicle 110. In some embodiments, the flight control module 350 determines that a collision is imminent based on an object map stored in the object map store 330.

The flight plan module 360 may be configured to execute a route for the aerial vehicle 110. The route may be path through space for the aerial vehicle 110 to fly. The flight plan module 360 may manipulate the appropriate electrical and mechanical subsystems of the aerial vehicle 110 to fly through the flight path. The route may be a predetermined route stored in a non-volatile memory of the aerial vehicle 110. The route may also be transmitted from the remote controller 120 (e.g., transmitted to the aerial vehicle 110 through the wireless network 125) and/or automatically generated by the flight plan module 360. The route may be defined in reference to GPS coordinates. In some embodiments, the flight plan module 360 initiates a route by taking control of the aerial vehicle 110 from the flight control module 350.

In some embodiments, the route may be a return path with a predefined return location. The flight plan module 360 may be triggered to begin a return path in response to a condition, such as, user action at the remote controller 120 (e.g., a user pressing the return button 165), low battery power, a mechanical condition (e.g., motor engine stall or burnout), and/or an environment condition (e.g., wind speed in excess of a predefined threshold). When a condition occurs to trigger a return path, the flight plan module 360 may generate a return path for the aerial vehicle 110.

In some embodiments, the flight plan module 360 may generate a cinematic route for the aerial vehicle 110 so that the gimbal camera 115 can capture video. For example, the flight plan module 360 may produce a cinematic route in which the aerial vehicle 110 rotates around an object (e.g., a person or a building) or a point in space. The cinematic route may also be a tracking shot (e.g., tracking a moving object, animal, or person based on machine vision algorithms and following with the aerial vehicle 110). The cinematic route may be generated and/or initiated in response to the aerial vehicle 110 receiving instructions from the remote controller 120. The instructions may specify the type of cinematic route and additional parameters, e.g., a radius of rotation or a follow distance for a tracking shot.

The flight plan module 360 may generate a route based on the current position of the aerial vehicle 110, a destination (e.g., a return location), the current status of the aerial vehicle 110 (e.g., the amount of charge in a battery), and/or atmospheric conditions (e.g., current wind conditions, prevailing wind conditions, or current humidity). The route may also be based on position data for objects previously detected by the object detection sensor 320. The flight plan module 360 may receive a map of objects from the object map store 330 that stores objects previously detected by the object detection sensor 320 and generate a route to avoid collisions with those objects. Similarly, if the flight plan module 360 is flying a route, the flight plan module 360 may alter the route when the object detection sensor 320 detects an obstacle in or near the flight path.

The object detection sensor 320 includes hardware elements for emitting (e.g., the IR emitter 321) and detecting (e.g., the cameras 322) electromagnetic radiation. The object detection sensor 320 also includes digital logic for interfacing with the hardware elements, controlling the hardware elements, receiving data output by the detectors, transforming the data from the detectors to determine position data for objects, or performing any other function attributed to the object detection sensor 320 herein. The digital logic may be a digital circuit (e.g., transistor and/or diode logic), an application-specific integrated circuit (ASIC), a field-programmable gate array (FPGA), software executed by one or more processor, or some combination thereof. Software may include a set of instructions for performing the functions attributed to modules above. The software instructions may be stored in a non-volatile computer-readable storage medium on the aerial vehicle 110. The object detection sensors 320 may also include mechanical structures for supporting and protecting its components (e.g., a chassis, a monocoque, or a semi-monocoque).

Object Detection Sensor

Figure 4A:
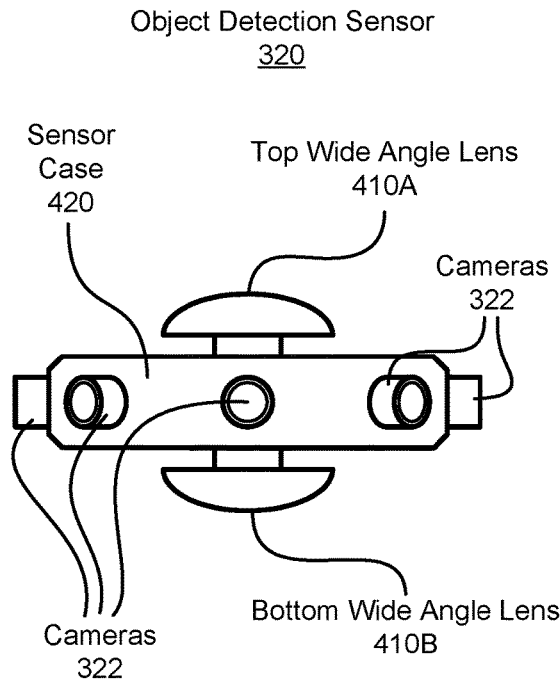
FIGS. 4A and 4B illustrate an object detection sensor, in accordance with an embodiment.
Figure 4B:
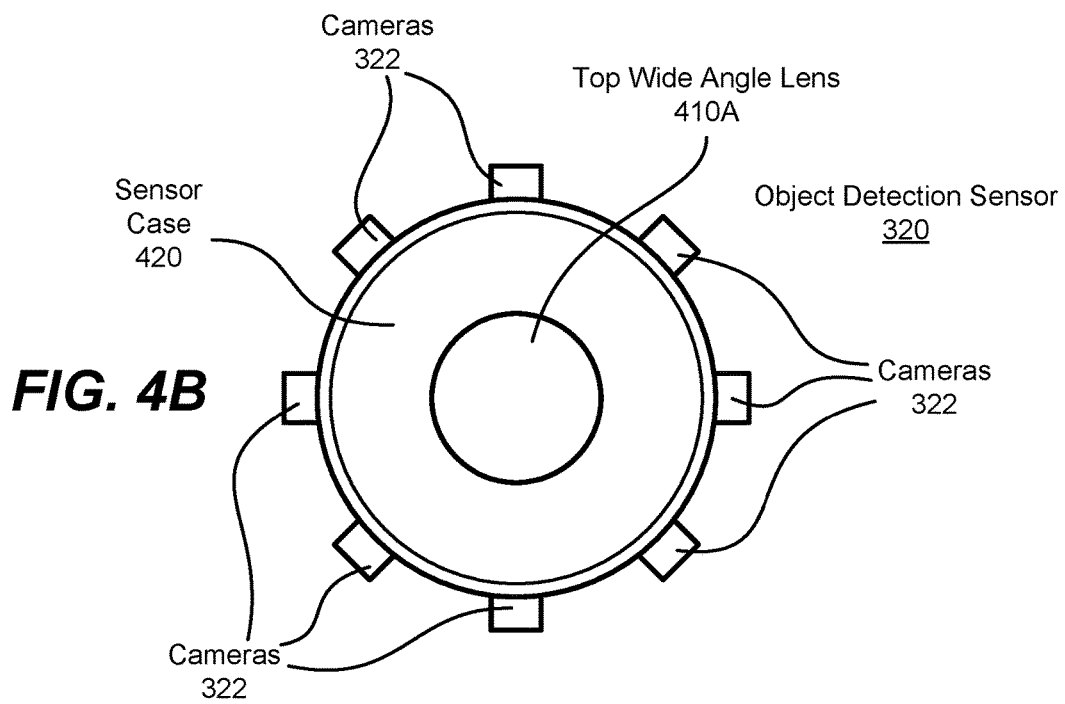

FIGS. 4A and 4B illustrate an object detection sensor 320, in accordance with an embodiment. The object detection sensor 320 may be part of an aerial vehicle 110. FIG. 4A illustrates an elevation view of the object detection sensor 320 and FIG. 4B illustrates a plan view of the object detection sensor 320. The object detection sensor 320 includes a top wide-angle lens 410A, a bottom wide-angle lens 410B, cameras 322, and a sensor case 420.

The top wide-angle lens 410A and bottom wide-angle lens 410B (collectively referred to herein as "wide-angle lenses 410") refract one or more IR beams generated by the object detection sensor 320. The one or more IR beams radiate out from the wide-angle lenses 410 into the environment surrounding the object detection sensor 320. The wide-angle lenses 410 may be, for example, hemispheric lenses, super hemispheric lenses, fisheye lenses, or some other type of wide-angle lenses. The wide-angle lenses 410 are part of the IR emitter 321.

The object detection sensor 320 includes a set of cameras 322. The cameras 322 may be coplanar (e.g., on a horizontal plane). As illustrated in FIGS. 4A and 4B, the cameras 322 may have even horizontal angular spacing with respect to the center of the object detection sensor 320. For example, the axis of each camera 322 in FIGS. 4A and 4B is offset 45° from each of the two adjacent cameras 322. The axis of each camera 322 (e.g., the center of the field of view of the camera 322) may be parallel or nearly parallel to the displacement vector between the camera 322 and the center of the IR emitter 321. The cameras 322 and the IR emitter 321 may protrude from the sensor case 420 which protects the elements of the object detection sensor 320.

Figure 5A:
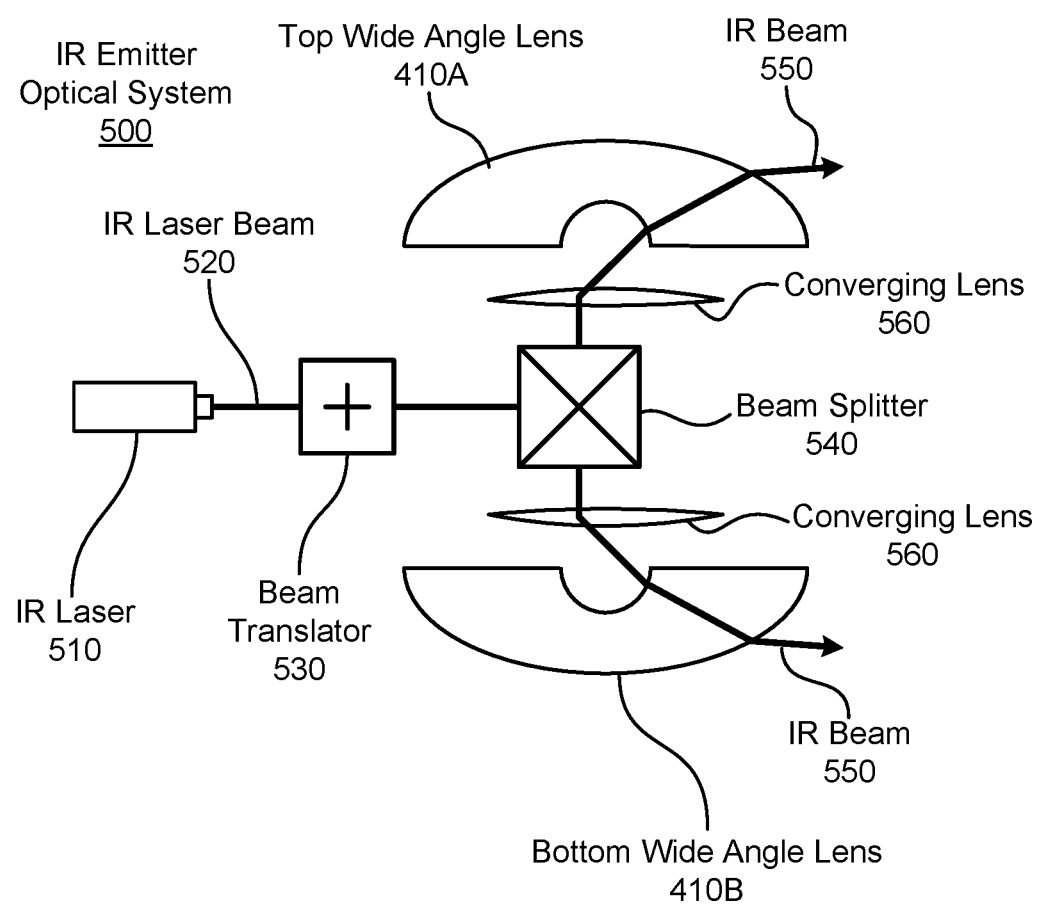
FIG. 5A illustrates an example of optical system in an infrared (IR) emitter that produces a sweeping IR beam, in accordance with an embodiment.

FIG. 5A illustrates an example of optical system 500 in an IR emitter that produces a sweeping IR beam, in accordance with an embodiment. FIG. 5A shows an optical system 500 of an IR emitter (e.g., the IR emitter 321) that includes an IR laser 510, a beam translator 530, a beam splitter 540, and two converging lenses 560. Although not shown in FIG. 5A for illustrative simplicity, the IR emitter 321 may also include actuators for controlling the position of its elements. The IR emitter 321 may further include control logic, which may be logic embodied in hardware on an integrated circuit, software instructions stored in a non-volatile computer-readable storage medium and executed by one or more processor on the aerial vehicle 110, or some combination thereof.

The IR laser 510 emits an IR laser beam 520 which is incident on the beam translator 530. The IR laser beam 520 may be a narrow beam of coherent collimated IR radiation. The beam translator 530 translates the position of the IR laser beam 520, but does not change its direction, so that the resultant beam is parallel to the incident beam. The beam translator 530 may adjust the position of the IR laser beam 520 in the direction perpendicular to the page of FIG. 5A. The beam translator 530 may include two parallel mirrors, the first mirror having a fixed position and reflecting the IR laser beam 520 towards the second mirror. The second mirror may have a variable position controlled by one or more actuators (not illustrated in FIG. 5A), so as to control the position of the resultant beam. The second mirror reflects the IR laser beam 520 after it is reflected by the first mirror. In alternate embodiments, the beam translator 530 includes two prisms instead of two mirrors.

The beam splitter 540 receives the IR laser beam 520 after it is translated by the beam translator 530. The beam splitter 540 splits the IR laser beam 520 into two IR beams 550. The power of the two IR beams 550 may each be approximately half that of the IR laser beam 520 incident on the beam splitter 540. The two IR beams 550 propagate in opposite parallel directions and are both orthogonal to the IR laser beam 520 incident on the beam splitter 540. The position of the beam splitter 540 may be controlled by one or more actuators (not illustrated in FIG. 5A), which move the beam splitter 540 in a direction parallel to the direction of the incident IR laser beam 520. Thus, the IR emitter 321 may adjust the position of the IR beams 550 produced by the beam splitter 540.

In alternate embodiments, the position of the beam splitter 540 is fixed. In an embodiment, two beam translators placed above and below the beam splitter 540 may translate the positions of the respective IR beams 550. In another embodiment, the beam translator 530 may translate the position of the IR laser beam 520 in two orthogonal directions. In such an embodiment, the beam translator 530 may include two single-directional beam translators in series.

Each IR beam 550 is refracted first by a respective converging lens 560 and subsequently refracted by a respective wide-angle lens 410. By adjusting the beam translator 530 and the beam splitter 540, the IR emitter 321 may control the position of the IR beams 550 incident on the converging lenses 560, thereby controlling the angle that the IR beams 550 propagate from the IR emitter 321. The IR emitter 321 may sweep the IR beams 550 through one or more angular paths so as to produce an IR pattern on objects in the environment of the IR emitter 321. An optical system includes the IR laser 510, the beam translator 530, the beam splitter 540, the converging lenses 560, and the wide-angle lenses 410, which interoperate to produce two IR beams 550 in directions controlled by the IR emitter 321 in the top and bottom hemispheres. In alternate embodiments, the IR emitter 321 may include any other optical system suitable for adjusting the angle of one or more IR beams 550 produced by the IR emitter 321. For example, in some embodiments, the optical system includes multiple IR lasers 510 and includes one or more reflective elements (e.g., mirrors) instead of the beam splitter 540. In some embodiments, the IR emitter 321 can adjust the position and/or orientation of the converging lens 560 instead of or in addition to the position of the beam splitter 540 and/or the beam translator 530. In some embodiments, the converging lenses 560 are omitted or replaced by another refractive element or series of refractive elements.

FIG. 5B illustrates an example of an optical system 570 of an IR emitter 321 that produces a fixed IR pattern, in accordance with another embodiment. Unlike the optical system 500 illustrated in FIG. 5A which produces a sweeping IR beam, the optical system 570 illustrated in FIG. 5B projects an entire IR pattern at each instance that the IR pattern is being projected. The optical system 570 of FIG. 5B includes an IR laser 510, a beam expander 535, a diffraction screen 575 and a wide angle lens 410.

The IR laser 510 produces IR radiation that is diffracted by the diffraction screen 575 to produce diffracted radiation 580. The IR laser 510 may produce an IR laser beam 520, which is expanded by the beam expander 535 to produce expanded IR radiation 538. The expanded IR radiation 538 is diffracted by the diffraction screen 575 to produce the diffracted radiation 580. The diffracted radiation 580 is then refracted by a wide angle lens 410, resulting in projected IR radiation 590. The axis of the wide angle lens 410 may be perpendicular to the surface of the diffraction screen 575. Although FIG. 5B illustrates only a single IR laser 510, a single beam expander 535, a single diffraction screen 575, and a single wide angle lens 410, in some embodiments the optical system 570 of the IR emitter 321 includes two of each (e.g., a top wide angle lens 410A and a bottom wide angle lens 410B). The top and bottom wide angel lenses 410A-410B may share the same lens axis.

The beam expander 535 may be telescopic beam expander, as illustrated in FIG. 5B or may be a prismatic beam expander. The expanded IR radiation 538 may be a plane wave. In some embodiments, the beam expander 538 spatially filters the IR radiation. The diffraction screen 575 may be a diffraction grating, film, and/or mask. The diffraction screen 575 may diffract the expanded IR radiation 538 to generate proper rays to produce projected radiation 590 with a particular IR pattern after passage through the wide angle lens 410. The diffraction screen 575 may produce diffracted radiation 580 with a particular cross section so that when the diffracted radiation 580 is refracted by the wide angle lens 410, it produces a particular IR pattern. In some embodiments, the pattern of the diffraction screen 575 is generated via computer generated holography. That is, the diffraction screen 575 may be a computer generated holograph.

In some embodiments, the IR emitter 321 with the optical system 570 produces pulses of IR radiation by controlling the laser 510. The cameras 322 of the object detection sensor 320 may capture images with a global shutter and the exposure time period of the cameras 322 may by synchronized with pulse period of the IR emitter 321. In this way, the cameras 322 may capture the IR pattern with a high signal-to-noise ratio.

Two diffraction screens 575 in the IR emitter 321 may convert collimated coherent IR radiation into a spherical IR pattern. Expanded IR radiation 538 may each be incident on two diffraction screens 575 to produce diffracted radiation 580 that is refracted by the top wide angle lens 410A and the bottom wide angle lens 410B. The projected IR radiation 590 from the top wide angle lens 410A may correspond to the top hemisphere of the IR pattern and the projected IR radiation 590 from the bottom wide angle lens 410B may correspond to the bottom hemisphere of the IR pattern.

Figure 6A:
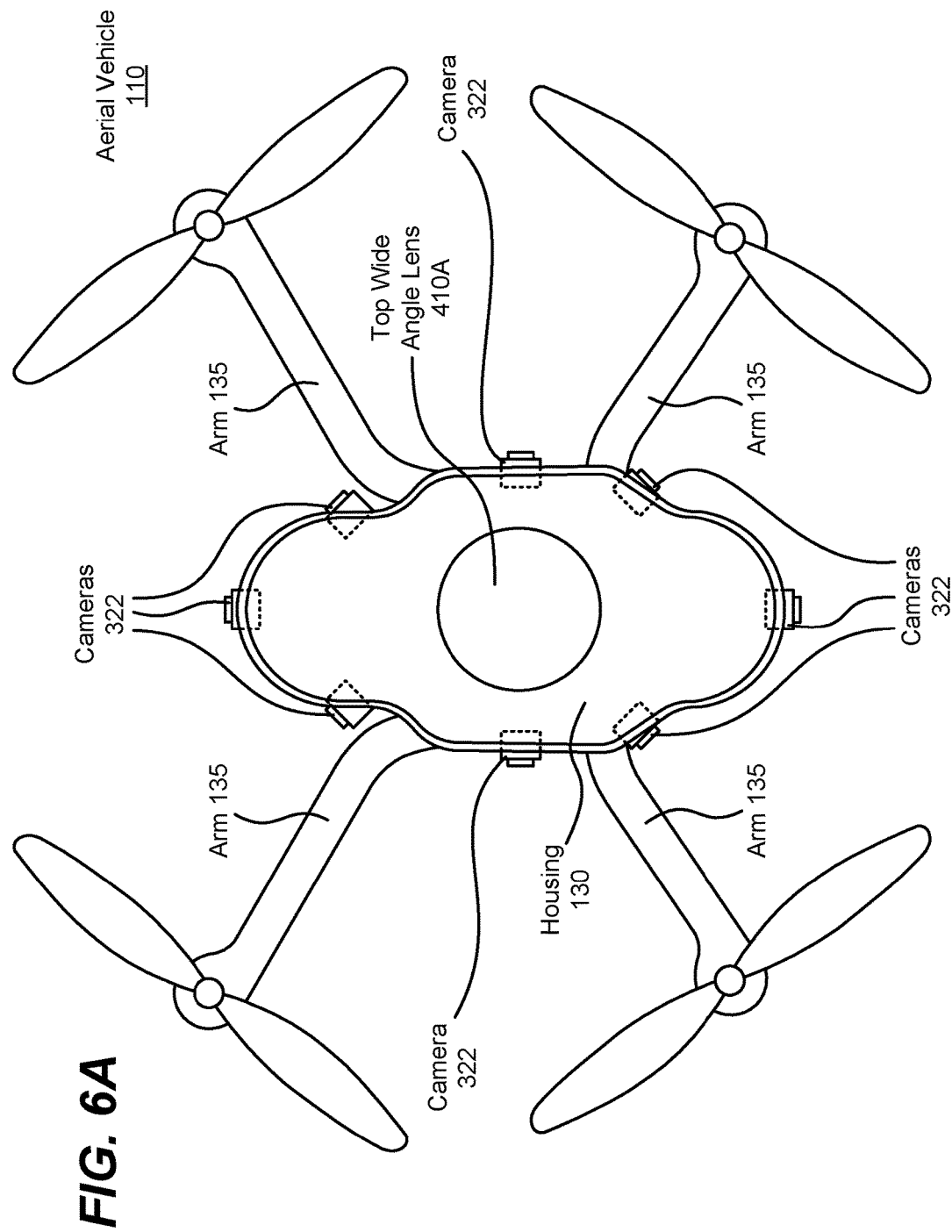
FIG. 6A illustrates positions of cameras on an aerial vehicle, in accordance with an embodiment.

The cameras 322 of the object detection sensor 320 may be positioned in a circle, as shown in FIGS. 4A and 4B. However, alternate positions for the cameras 322 are possible. For example, FIG. 6A illustrates positions of cameras 322 on an aerial vehicle 110, in accordance with an embodiment. The cameras 322 may be attached to the housing 130 of the aerial vehicle 110. As illustrated by FIG. 6A, the cameras 322 may be placed at different distances from the IR emitter 321 and each be oriented away from the IR emitter 321.

Some or all of the cameras 322 may have wide-angle lens for capturing a large vertical field of view, so that objects illuminated by the IR emitter 321 above and below the aerial vehicle 110 may be detected by the cameras 322. In some embodiments, the object detection sensor 320 includes a camera 322 facing upwards and a camera 322 facing downwards.

Figure 6B:
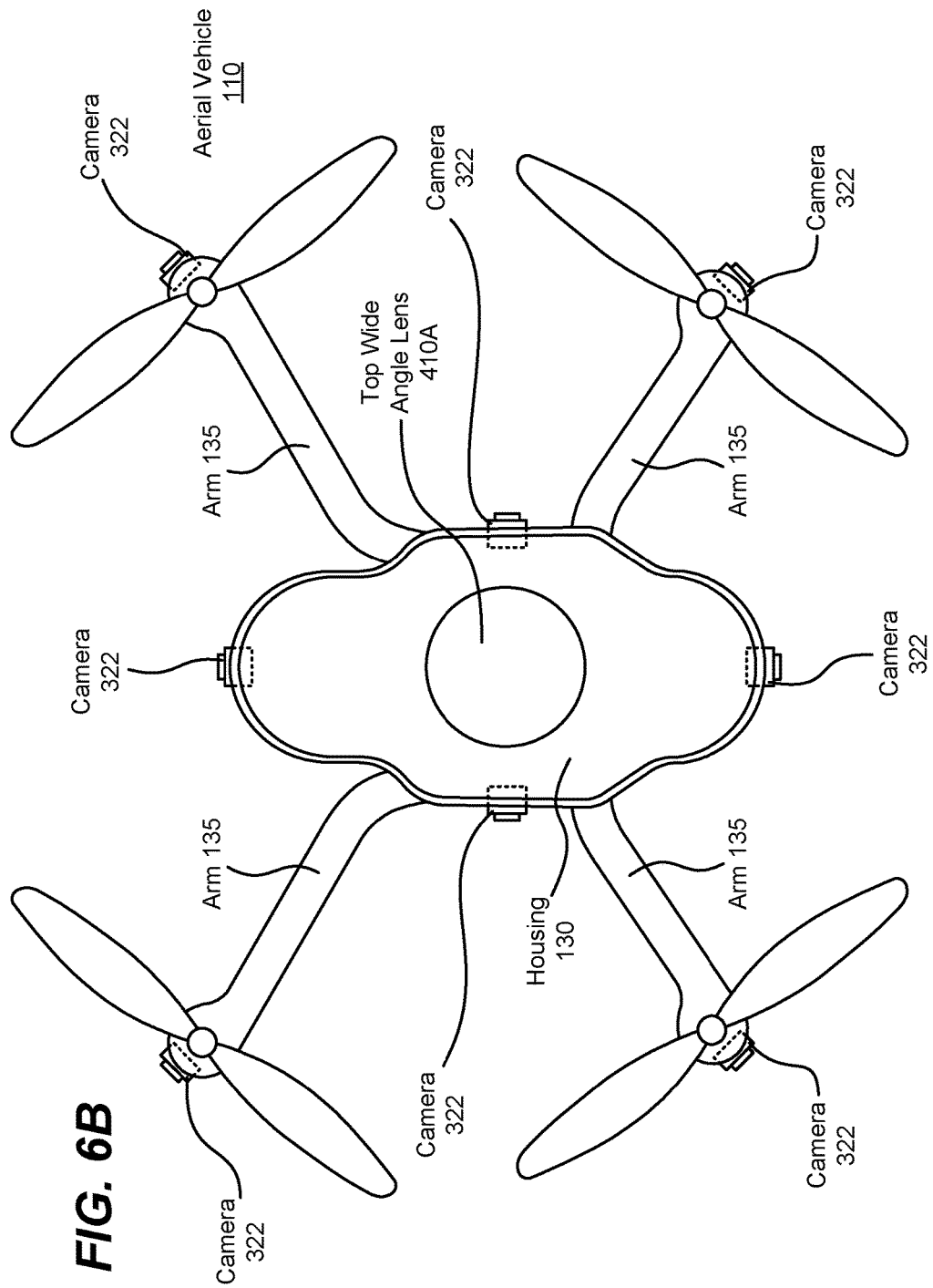
FIG. 6B illustrates positions of cameras on an aerial vehicle in which cameras are positioned on arms of the aerial vehicle, in accordance with an alternate embodiment.

FIG. 6B illustrates an aerial vehicle 110 in which some of the cameras 322 are positioned on arms 135 of the aerial vehicle 110, in accordance with an alternate embodiment. The cameras 322 may be positioned on the exterior of thrust motors 140. Such an embodiment may prevent field of view of the cameras 322 from being obstructed by arms 135 of the aerial vehicle 110.

Figure 6C:
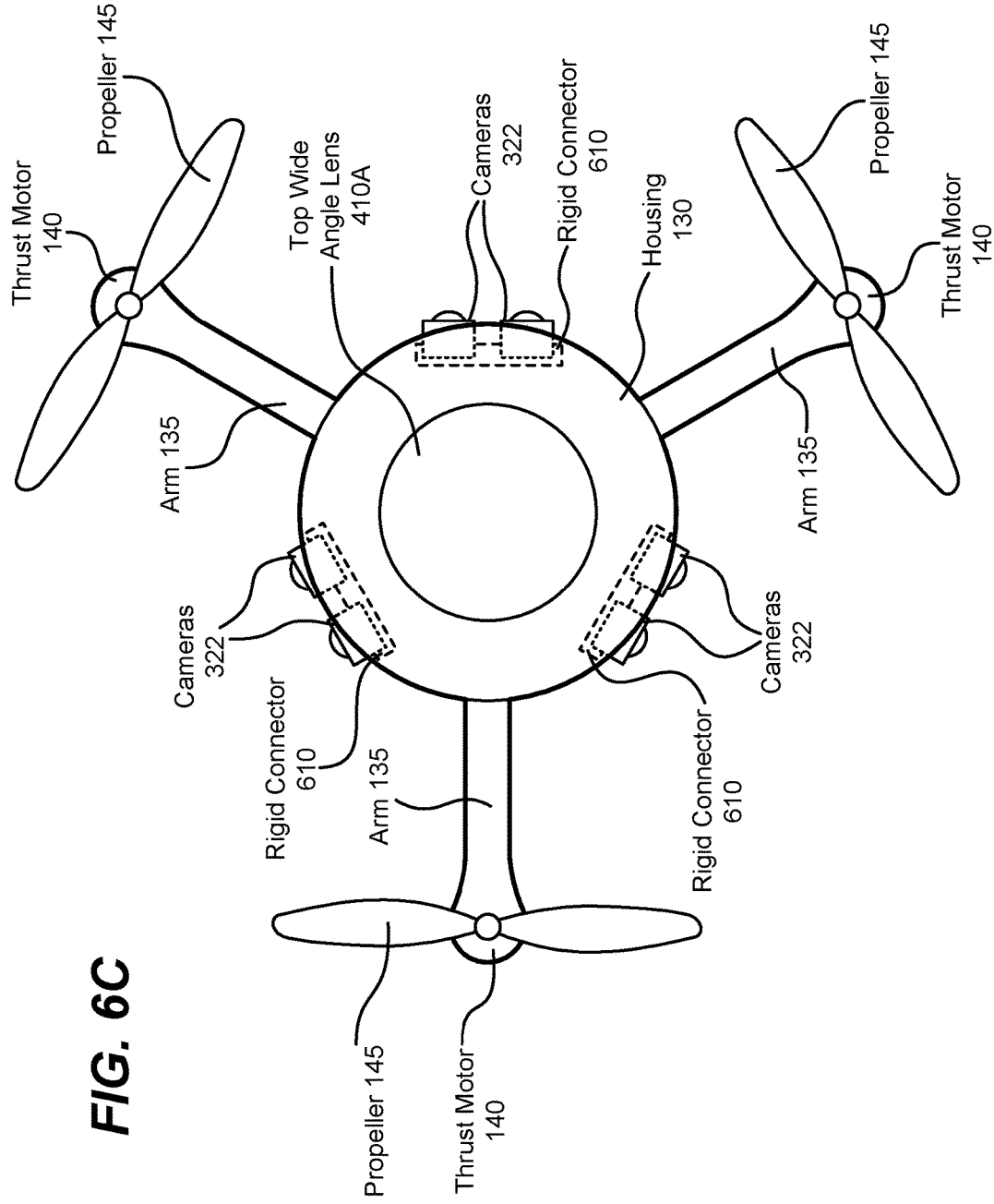
FIG. 6C illustrates positions of cameras on an aerial vehicle in which the cameras are positioned in pairs.

FIG. 6C illustrates positions of cameras 322 on an aerial vehicle 110 in which the cameras 322 are positioned in pairs. FIG. 6C illustrates an embodiment of the aerial vehicle 110 which includes three arms 135, each with a respective thrust motor 140 and a respective propeller 145. The angular displacement between each of the arms 135 may be 120°. The aerial vehicle 110 illustrated in FIG. 6C also includes three pairs of cameras 322 (i.e., six cameras 322 in total). Each pair of cameras 322 may be coupled together by a respective rigid connector 610 so that the relative position and relative angle between the two cameras 322 remains fixed.

In each pair of cameras 322, both cameras 322 may be oriented in the same direction. Both cameras 322 may capture overlapping images with a relative position offset, thereby enabling depth estimation of objects based on parallax. Each camera 322 may have a 180° field of view so that the fields of view of the cameras 322 overlap substantially. In some embodiments, each camera 322 may capture hemispherical images. The cameras 322 may be oriented and located at the half-angle between the arms 135 to mitigate occultation of the line of sight of each camera 322 by the arms 135.

Figure 7:
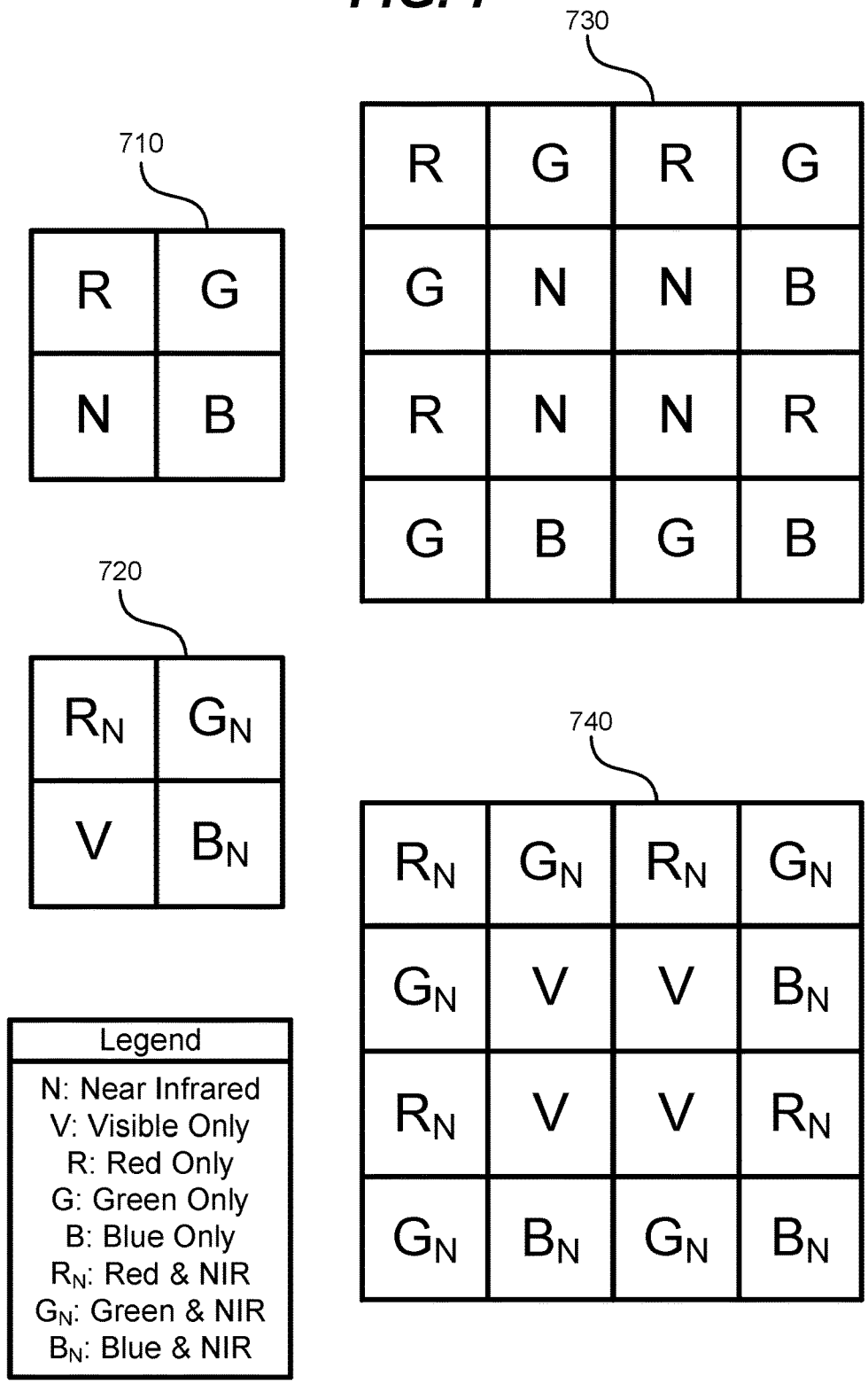
FIG. 7 illustrates subpixel layouts of image sensors for capturing IR and visible wavelength light, in accordance with various embodiments.

FIG. 7 illustrates subpixel layouts of image sensors for capturing infrared and visible wavelength light, in accordance with various embodiments. The subpixel layouts are illustrated in FIG. 7 by a unit cell corresponding to the pattern of spectral filter array placed over an image sensor of a camera 322. Each subpixel is a photosensor sensitive to one or more bands of electromagnetic radiation. Each subpixel corresponds to a region of the spectral filter array over a photo sensor.

The subpixel layouts include various types of subpixels. The visible light subpixels filter out IR light, but allow light in the visible spectrum to pass through. Visible light subpixels are referenced by "V" in FIG. 7. The red, green, and blue subpixels filter out all radiation (or most radiation) but red, green, and blue, respectively, in the visible spectrum. These subpixels are respectively referenced by "R," "G," and "B" in FIG. 7. The NIR subpixels (which are referenced by "N" in FIG. 7) block light in the visible spectrum, but allow radiation in the NIR spectrum to pass through. In some embodiments, the NIR subpixels have a frequency response with a narrow bandwidth centered on the frequency of the IR pattern projected by the IR emitter 321. The red and NIR, the green and NIR, and the blue and MR subpixels allow radiation in the NIR to pass through as well as visible light in the red, green, and blue spectrums, respectively. These subpixels are respectively referenced by "$R_N$," "$G_N$," and "$B_N$" in FIG. 7. Note that a subpixel layout of an image sensor does not necessarily include all of the aforementioned subpixels types.

Each camera 322 may output digital images with four channels: three visible light channels (e.g., red, green, and blue) and a NIR channel. Each pixel in the image captured by a camera 322 includes a value for each channel corresponding to the intensity of electromagnetic radiation (i.e., visible light or IR radiation) captured by subpixels mapped to the pixel in the spectrum of the channel. Herein, the channel values of an exemplary pixel in a captured image are referred to as $C_R$, $C_G$, $C_B$, $C_{NIR}$ for the red, green, blue, and NIR channels respectively.

The first unit cell 710 includes four subpixels: a red subpixel, a green subpixel, a blue subpixel, and a NIR subpixel. In one embodiment, each pixel is mapped to the subpixels in a respective first unit cell 710. The red channel value $C_R$ of a pixel may be based on the signal value captured by the red subpixel (the signal value being referenced herein as R) in the respective first unit cell 710. Similarly, the green channel value $C_G$, the blue channel value $C_B$, and the NIR channel value $C_{NIR}$ of the pixel may be based on the respective signal values of the green (G), the blue (B), and the NIR (N) subpixels captured by the of the corresponding unit cell 710. In one embodiment, the channel values for a pixel corresponding to the first unit cell 710 are:

$$C_{NIR}=N \quad (3)$$

$$C_R=R \quad (4)$$

$$C_G=G \quad (5)$$

$$C_B=B \quad (6)$$

The second unit cell 720 includes four subpixels: a red and NIR subpixel, a green and NIR subpixel, a blue and NIR subpixel, and a visible light subpixel. The channel values for a pixel may be based on the signal values captured by the red and NIR ($R_N$), the green and NIR ($G_N$), the blue and NIR ($B_N$), and the NIR (N) subpixels of the corresponding unit cell 710. In one embodiment, the channel values for a pixel corresponding to the second unit cell 720 are:

$$C_{NIR}=(R_N+G_N+B_N-V)/3 \quad (7)$$

$$C_R=R_N-C_{NIR} \quad (8)$$

$$C_G=G_N-C_{NIR} \quad (9)$$

$$C_B=B_N-C_{NIR} \quad (10)$$

The third unit cell 730 includes sixteen subpixels: four NIR subpixels, four red subpixels, four green subpixels, and four blue subpixels. The red channel value $C_R$ for a pixel may be determined based on the signal value of the red subpixels R, where the signal value of the red subpixels R is based on the signal values of each of the four red subpixels (e.g., a summation or an average of each of the signal values for each of the red subpixels) in the corresponding third unit cell 730. The green channel value $C_G$, blue channel value $C_B$, and the NIR channel $C_{NIR}$ may be similarly determined based on the signal values of the respective subpixels. In some embodiments, the channel values for a pixel corresponding to the third unit cell 730 may be determined based on equations (3)-(6) above.

The fourth unit cell 740 includes sixteen subpixels: four visible light subpixels, four red and NIR subpixels, four green and NIR subpixels, and four blue and NIR subpixels. The channels values for the fourth unit cell 740 may be determined based on equations (5)-(8) above.

The channel values for a pixel may be calculated based on the captured signal values for subpixels in a single unit cell, as described above, or in alternate embodiments, the channel values may be determined by demosaicing the signal values of the subpixels. Although the visible channels are described herein as being red, green, and blue channels, the cameras 322 may alternately output images in any other color space.

Example IR Patterns

Figure 8A:
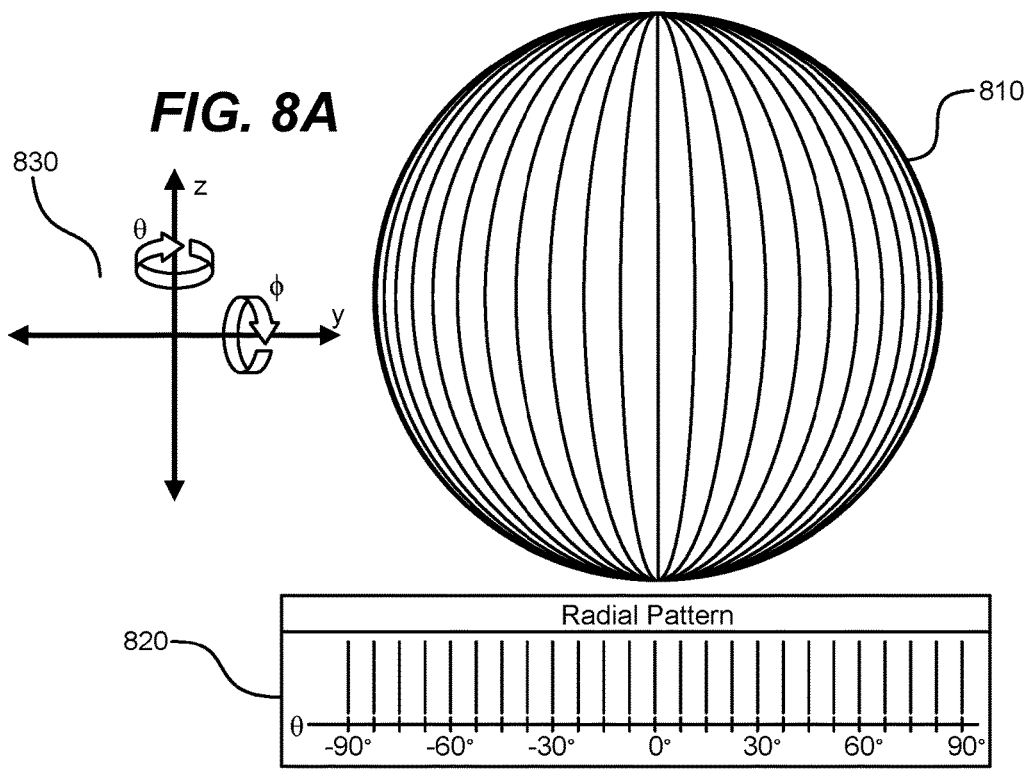
FIG. 8A illustrates an evenly spaced pattern projected by the IR emitter of the object detection sensor, in accordance with an embodiment.

FIG. 8A illustrates an evenly spaced pattern 810 projected by the IR emitter 321 of the object detection sensor 320, in accordance with an embodiment. The evenly spaced pattern 810 may include one or more paths swept by one or more IR beams radiating from the IR emitter 321 (e.g., by an emitter 321 that includes the optical system 500 illustrated in FIG. 5A). In some embodiments, the pattern projected by the IR emitter 321 of the object detection sensor 320 can be characterized by one or more paths through the yaw θ and pitch ϕ angles (the yaw θ and the pitch ϕ being depicted by the Cartesian coordinate system 830). Alternately, the entire evenly spaced pattern 810 may be projected as a fixed pattern (e.g., by an emitter 321 that includes the optical system 570 illustrated in FIG. 5B). FIG. 8A illustrates a projection of the evenly spaced pattern 810 onto a sphere. The center of the sphere corresponds to the center of the IR emitter 321. The evenly spaced pattern 810 represents the directions that the IR beam radiates from the IR emitter 321. In the evenly spaced pattern 810, each path is a line, as defined in spherical geometry, between the top of the sphere (ϕ=90°) and the bottom of the sphere (ϕ=−90°). The lines may be the pattern features of the evenly space pattern 810.

The evenly spaced pattern 810 includes multiple segments that extend between the positive z-axis and the negative z-axis of the Cartesian coordinate system 830. Each segment of the evenly spaced pattern 810 has a constant yaw θ (i.e., angle on the horizontal plane). The radial pattern chart 820 shows the angular distribution of segments of the evenly spaced pattern 810 along the yaw θ axis. In the evenly spaced pattern 810 illustrated in FIG. 8A, the yaw θ angles of two sequential segments are separated by 7.5°. However, in alternate embodiments, sequential segments may be separated by some other angle.

Figure 8B:
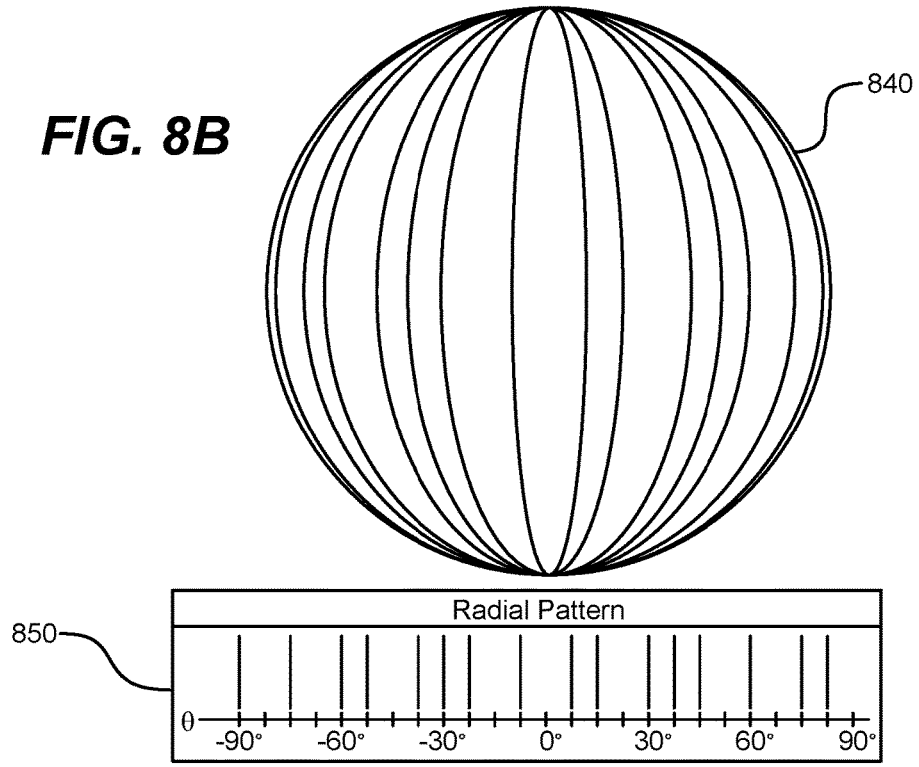
FIG. 8B illustrates an irregularly spaced pattern projected by the IR emitter of the object detection sensor, in accordance with an embodiment.

FIG. 8B illustrates an irregularly spaced pattern 840 projected by the IR emitter 321 of the object detection sensor 320, in accordance with an embodiment. FIG. 8B illustrates a projection of the irregularly spaced pattern 840 onto a sphere and a radial pattern chart 850 showing the angular distribution of the segments of the irregularly spaced pattern 840. In the irregularly spaced pattern 840, the angles between successive longitudinal lines are not uniform. The segments of the irregularly spaced pattern 840 are similar to those of the evenly spaced pattern 810 illustrated in FIG. 8A, except that some segments from the evenly spaced pattern 810 are not included in the irregularly spaced pattern 840. For example, the irregularly spaced pattern 840 does not include segments at yaw θ angles of −15°, 0°, 22.5°, and 52.5°. The segments in the irregularly spaced pattern 840 may be distributed according to a pattern such as the pattern shown in FIG. 8B: sequential groups of segments including a group of one segment, a group of two segments, and a group of three segments, each group separated by a gap of 15°. The irregularly spaced pattern 840 may be produced by an IR emitter 321 with an optical system 570 similar to that shown in FIG. 5B.

When an IR emitter 321 produces an irregularly spaced pattern 840, the resultant pattern projected onto objects in the environment of the object detection sensor 320 will include the gaps between segments. Based on the gaps, the IR feature detector 324 may be able to more accurately determine the pattern feature to which an illumination feature in an image captured by a camera 322 corresponds. For example, if a series of lines from the irregularly spaced pattern 840 are incident on an object, the IR feature detector 324 may be able to determine the pattern feature that each illuminated line in an image corresponds to based on the pattern of gaps in the illuminated lines.

FIG. 9A illustrates IR beams 910A-910G (e.g., pattern features) from an IR emitter 321 that produce an IR pattern and a camera 322 that captures the IR pattern, in accordance with an embodiment. FIG. 9A illustrates an IR emitter 321 emitting seven IR beams 910A-910G (collectively referred to herein as IR beams 910). The IR beams 910 may correspond to a subset of the segments of the evenly spaced pattern 810. Each IR beams 910 may correspond to a longitudinal line in the evenly spaced pattern 810. In FIG. 9A, the IR emitter 321 is idealized, for illustrative clarity, as emitting the IR beams 910 from a single point. If the IR beams 910 are incident on an object in the environment of the object detection sensor 320, the resultant reflected IR pattern may be detected by a camera 322 (also idealized in FIG. 9A as a single point for illustrative simplicity) of the object detection sensor 320. The camera 322 may detect an angular position for an object illuminated by one or more of the IR beams 910.

Because of parallax, the angular position detected by the camera 322 of an object illuminated by an IR beam 910 will vary based on the distance between the IR emitter 321 and the object. FIG. 9A also illustrates the angle bounds 920A-920C, 920E-920G (collectively referred to herein as angle bounds 920) of the angular position, detected by the camera 322, of illumination features corresponding to respective IR beams 910A-910C, 910E-910G. For example, the angle of the leftmost angle bound 920A corresponding to the leftmost IR beam 910A is equal to the angle of the leftmost IR beam 910A, because that would be the angular position, detected by the camera 322, of an object infinitely displaced from the IR emitter 321 that is illuminated by the IR beam 730A. Thus, the angle between an object illuminated by the IR beam 730A and the camera 322 will be to the left of the leftmost angle bound 920A. The central IR beam 910D is aligned with the camera 322. Thus, the angular position, detected by the camera 322, of an object illuminated by the central IR beam 910D does not vary with the distance between the object and the IR emitter 321.

With the exception of the central IR beam 910D, the distance between an illumination feature produced by an IR beam 910 and the IR emitter 321 may be determined based on the angular position of the illumination feature captured by the camera 322 based on the known angle of the IR beam 910. For example, the position of an illumination feature (and the object on which it is incident) may be determined by solving the system of equations given above by Equations (1) and (2). Thus, the position in space of the object can be determined by the object detection sensor 320 with only a single camera 322. However, it may not be possible to determine the position of the object based on angular geometry if the object detection sensor 320 cannot determines which of the IR beams 910 is illuminating the object. Thus, at certain angles, the object detection sensor 320 may not be able to conclusively determine the position of an illuminated object.

The first circle 930A and the second circle 930B illustrated by FIG. 9A show minimum distances between the IR emitter 321 and an object illuminated by an IR beam 910 at which the IR beam 910 that illuminated the object can be unambiguously determined based only on the angular position of the object in an image captured by a single camera 322. The first circle 930A intersects with the intersection of the third leftmost IR beam 910C and the second leftmost angle bound 920B corresponding to the second leftmost IR beam 910B. The first circle 930A also intersects with the intersection of the third rightmost IR beam 910E and the second rightmost angle bound 920B. Based on geometry, the object detection sensor 320 can unambiguously determine whether an object that is further away from the IR emitter 321 than the first circle 930A (i.e., is not within the first circle 930A) was illuminated by the second leftmost IR beam 910B or third leftmost IR beams 910C even if the illumination of the object was detected by only the single camera 322.

Similarly, the second circle 930B intersects with the intersection of the second leftmost IR beam 910B and the leftmost angle bound 920A corresponding to the leftmost IR beam 730A and intersects with the second rightmost IR beam 910F and the rightmost angle bound 920G. The second circle 930B corresponds to the minimum distance between an object and the IR emitter 321 at which it can be determined whether the object is illuminated by the leftmost IR beam 910A or the second leftmost IR beam 910B (or determined between the rightmost and second rightmost IR beams 910A-910B). Therefore, the object detection sensor 320 can determine that an object is illuminated by a particular IR beam 910 without ambiguity when the distance between the object and the IR emitter 321 is greater than a minimum distance illustrated by the second circle 930B.

FIG. 9B illustrates angular regions in the field of view of a camera 322 that are determined by the IR feature detector 324 of the object detection sensor 320 to correspond to particular IR beams 910, in accordance with an example embodiment. In the embodiment illustrated in FIG. 9B, the IR beams 910A-910C, 910E-910G correspond to the angular regions 940A-940C, 940E-940G, respectively. The angular regions 950A-950B do not correspond to any IR beams 910, and during correct operation of the object detection sensor 320, no illuminated features will be detected in these angular regions 950A-950B. The central IR beam 910D does not correspond to an angular region because the angular position of an illumination feature corresponding to the central IR beam 910D is invariant.

If the IR pattern projected by the IR emitter 321 is irregular (e.g., the irregularly spaced pattern 840), the IR feature detector 324 may determine the pattern feature to which a detected illumination feature corresponds based on the irregular spacing pattern. For example, if the IR emitter 321 does not produce the rightmost IR beam 910G, then the IR feature detector 324 does not need to disambiguate between the rightmost IR beam 910G and the second rightmost IR beam 910F. Thus, the IR feature detector 324 can determine that an object illuminated by an IR beam 910 is being illuminated by the second rightmost beam 910F even if the angular position of the illuminated object is nominally in the rightmost angular region 940G. In this way, by not projecting certain IR beams, the object detection sensor 320 may better disambiguate between pattern features projected by the IR emitter 321, albeit at the cost of an IR scan with a lower resolution.

Figure 10A:
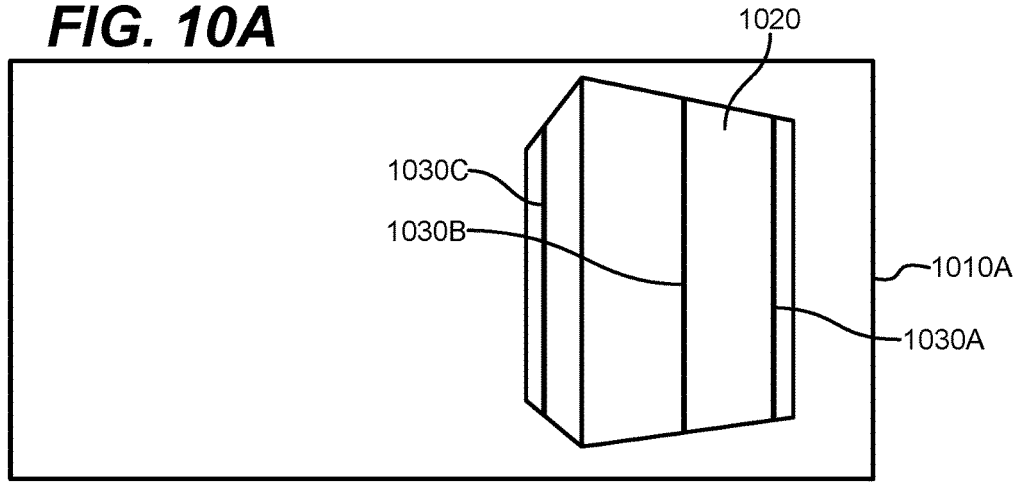
FIGS. 10A-10B illustrate images captured by two cameras that include illumination features from an IR pattern projected onto a box.
Figure 10B:
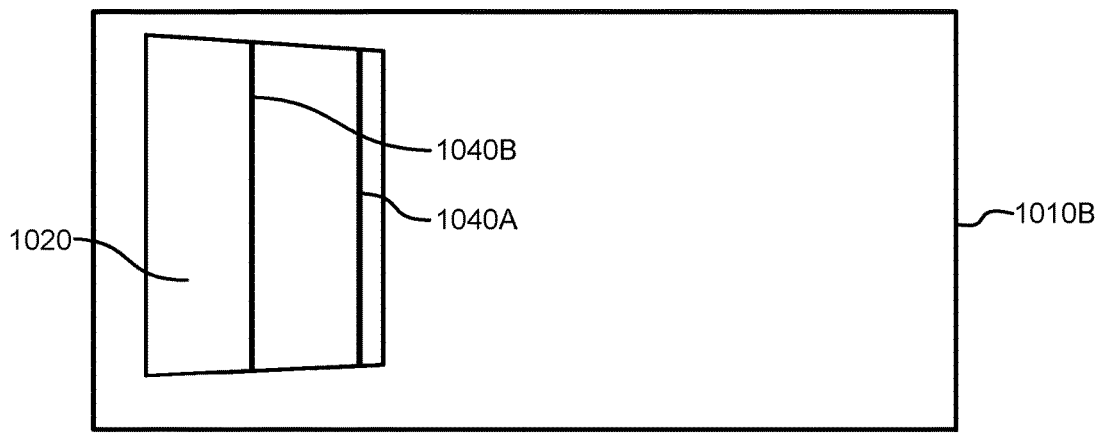

FIGS. 10A-10B are an illustrative example of a first image 1010A and a second image 1010B captured by respective cameras that include illumination features from an IR pattern projected onto a box 1020, in accordance with an embodiment. This simplified example illustrates how the object detection sensor 320 may determine the positions of objects based on captured images. The images 1010A-1010B show both an IR channel and visible channels. The first image 1010A includes a box 1020 (which may be detected based on visible channels) with three illumination features 1030A-1030C projected thereon. The second image 1010B includes the same box 1020 from a different perspective with two illumination features 1030B-1030C projected thereon.

Figure 10C:
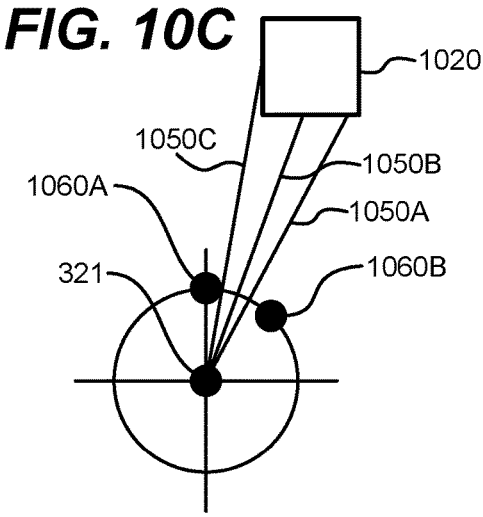
FIG. 10C illustrates two cameras of an object detection sensor detecting a box, in accordance with an embodiment.

FIG. 10C illustrates an overhead diagram of the first camera 1060A and the second camera 1060B (e.g., cameras 322) that captured the images 1010A-1010B, respectively. The IR emitter 321 projects three IR beams 1050A-1050C onto a box 1020 in the environment. In the embodiment illustrated in FIGS. 10A-10C, the pattern features corresponding to the illumination features 1030A-1030C are projected as IR beams 1050A-1050C, respectively. The illumination features 1040A-1040B in the second image 1010B correspond to the IR beams 1050A-1050B. Based on the captured images 1010A-1010B, the object detection sensor 320 that includes the cameras 1060A-1060B and the IR emitter 321 may detect the position of the box 1020.

The visible object detector 325 may identify the areas of pixels that correspond to the box (e.g., via image segmentation) in both images 1010A-1010B. The visible object detector 325 also may classify the box 1020 (e.g., if the box 1020 is a building it may be classified as such).

The IR feature detector 324 may detect three illumination features 1030A-1030C in the first image 1010A and two illumination features 1040A-1040B in the second image 1010B. The IR feature detector 324 may determine the portion of each illumination feature 1030A-1030C, 1040A-1040B that is incident on the box 1020 based on the visible channels (e.g., based on the portion of an illumination feature in a segment of an image determined by the visible object detector 325 to correspond to the box 1020). The IR feature detector 324 may determine that the first and second illumination features 1030A-1030B detected by the first camera 1060A correspond to the same pattern features as the first and second illumination features 1040A-1040B detected by the second camera 1060B. The IR feature detector 324 may also determine that the first illumination features 1030A, 1040A correspond to the first IR beam 1050A of the IR pattern projected by the IR emitter 321. Similarly, the IR feature detector 324 may determine that the second illumination features 1030B, 1040B correspond to the second IR beam 1050B and that the third illumination feature 1030C corresponds to the third IR beam 1050C.

The position determination module 326 may determine position data for the box 1020. The position determination module 326 may determine position data by determining positions for the illumination features. The position determination module 326 may determine a position for the first illumination features 1030A, 1040A based on a comparison of their respective angular positions in their respective images 1010A-1010B (e.g., via stereo depth estimation). The position determination module 326 may also determine the position of the illumination features 1030A, 1040A based on the angular positions compared to the direction that the IR emitter 321 projected the first IR beam 1050A. The positions of the illuminated features may also be determined based on a combination of these two techniques. The position determination module 326 may determine a position for the second illumination features 1030B, 1040B in a similar manner.

Because the third illumination feature 1030C is only captured in the first image 1010A, the position determination module 326 cannot determine the position of third illumination feature 1030C with stereo depth estimation. However, the position determination module 326 may still determine the position of the third illumination features 1030C based on a comparison of its angular position in the first image 1010A compared to the direction that the IR emitter 321 projected the third IR beam 1050C.

The position determination module 326 may also determine additional position data about the box 1020 based on the illumination features. For example, the position determination module 326 may estimate the height of the box 1020 based on the heights of the illumination features 1030A-1030C, 1040A-1040B in the images 1010A-1010B.

The determination of the height of the box 1020 may be further based on the determination of the distance between each illumination feature detected by a camera and the camera 1060A-1060B.

Example Object Detection Processes

Figure 11:
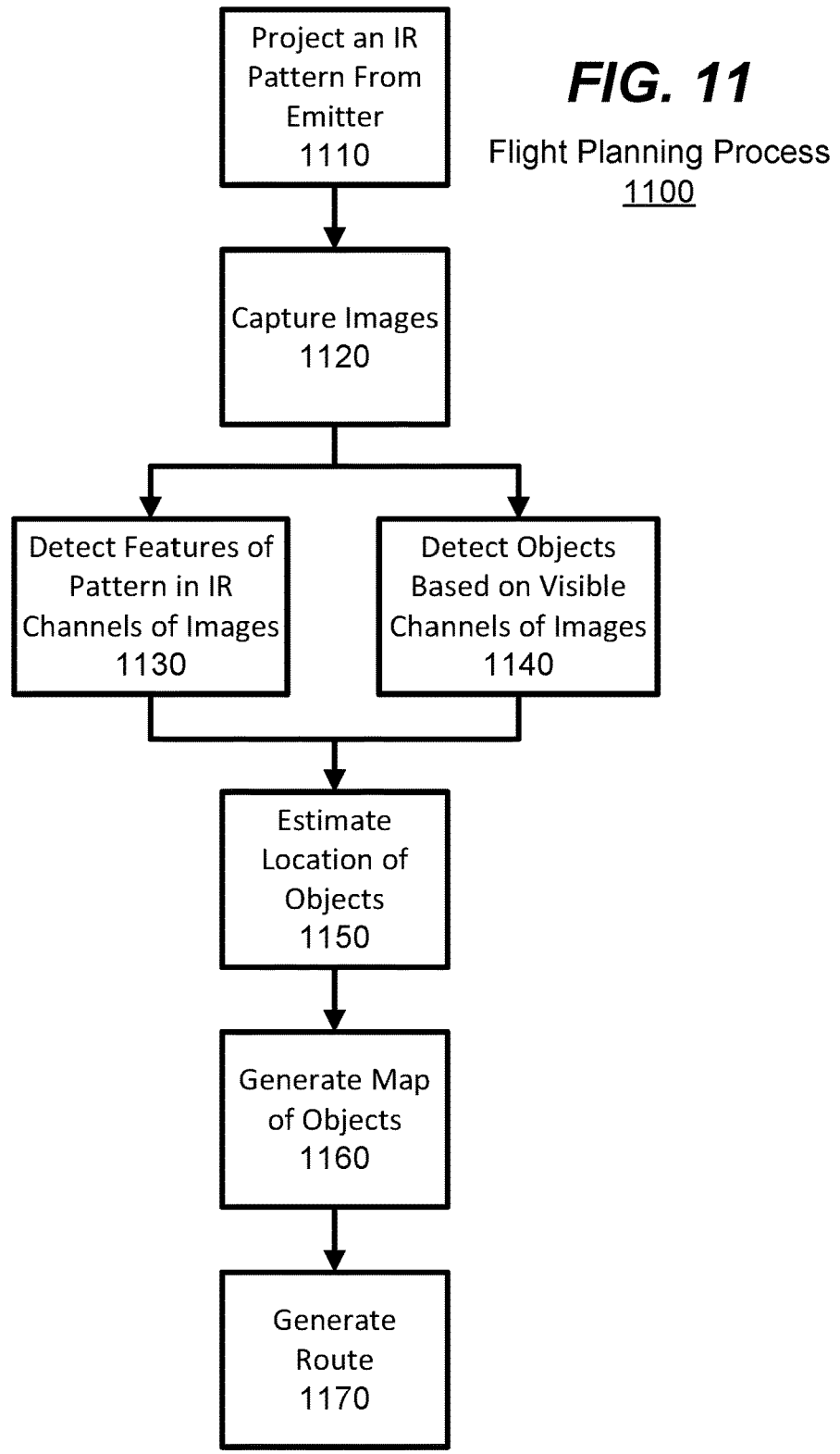
FIG. 11 is block diagram of a flight planning process for detecting objects and determining a route for an aerial vehicle 110 in accordance with an embodiment.

FIG. 11 is block diagram of a flight planning process 1100 for detecting objects and determining a route in accordance with an embodiment. The flight planning process 1100 may be performed by a vehicle (e.g., aerial vehicle 110) with an object detection sensor (e.g., object detection sensor 320). Embodiments may include different and/or additional steps, or perform the steps in different orders. The flight planning process 1100 may be performed by computer instructions executed by one or more processors on the vehicle by interfacing with a hardware emitter (e.g., the IR emitter 321) and sensors (e.g., cameras 322). The computer instructions may be stored in a non-volatile computer-readable storage medium on the vehicle.

The object detection sensor projects 1110 an IR pattern. For example, the IR emitter 321 of the object detection sensor 320 may project an IR pattern including a plurality of pattern features. The IR emitter 321 may be controlled by the sensor controller 323.

The object detection sensor captures 1120 a plurality of images with respective cameras (e.g., cameras 322). For example, the cameras 322 may capture digital images each having one or more visible channels (e.g., a red, green, and blue channel) and an IR channel.

The object detection sensor detects 1130 illumination features of IR patterns in the IR channels of the captured images. For example, the IR feature detector 324 may determine the pattern feature from the projected IR pattern to which a detected illumination feature in an image corresponds. The IR feature detector 324 may also determine that illumination features captured by multiple cameras corresponds to the same pattern feature.

The object detection sensor detects 1140 visible objects based on visible channels of the images captured by the cameras. For example, the visible object detector 325 may classify visual objects with an object classifier. The visible object detector 325 may also perform image segmentation to determine which pixels in an image correspond to a visual object.

The object detection sensor estimates 1150 the location of objects. The estimation 1150 of the locations may be based on detected illumination features and/or detected visible objects. For example, the position determination module 326 may determine the position of objects based on illumination features detected from the IR pattern. The position determination module 326 may estimate the location of the illumination features based on parallax (e.g., parallax between the IR emitter 321 and a camera 322, parallax between two or more cameras 322, or both). The position determination module 326 may also determine the position of objects based on detected visible objects detected. The position determination module 326 may also determine additional pattern data for objects as described above.

The object detection sensor generates 1160 a map of objects. For example, the position determination module 326 may generate a map of objects or update a map of objects. The map of objects may be stored in the object map store 330.

The vehicle generates 1170 a route for the vehicle to traverse. For example, the flight plan module 360 may generate a route for the aerial vehicle 110 to fly based on an object map stored in the object map store 330. In some embodiments, the vehicle automatically begins to traverse the route after it is generated.

FIG. 12 is block diagram of a collision avoidance process 1200 for detecting objects and determining whether to perform control instructions in accordance with an embodiment. The collision avoidance process 1200 may be performed by one or more processors on a vehicle (e.g., an aerial vehicle 110) with an object detection sensor (e.g., object detection sensor 320). The collision avoidance process 1200 may be embodied as computer code stored in a non-volatile memory of the vehicle.

As with the flight planning process 1100, the object detection sensor may perform the collision avoidance process 1100 with the IR pattern by projecting 1110 an IR pattern from an emitter (e.g., the IR emitter 321), capturing 1120 images, detecting 1130 illumination features of the IR pattern in the IR channels of the captured images; detecting 1140 objects based on the visible channels of the images, and estimating 1150 locations of the objects.

The vehicle receives 1210 the trajectory of the vehicle. The trajectory may be received from sensors on an aerial vehicle 110 (e.g., a telemetric subsystem that includes some combination of navigational components, such as a gyroscope, an accelerometer, a compass, a global positioning system (GPS), and a barometric sensor).

The vehicle receives 1220 control instructions. The control instructions may be received from a remote controller 120 operated by a user via the communication interface 340. The control instructions may also be generated by the flight plan module 360 based on a route.

The vehicle checks 1230 whether a collision is imminent based on the trajectory and the estimated object locations. For example, the flight control module 350 may determine the aerial vehicle 110 will collide with an object detected by the object detection sensor. In some embodiments, checking for an imminent collision uses the current trajectory of the aerial vehicle 110 and an object map stored in the object map store 330.

If the vehicle determines that a collision is not imminent, the vehicle performs 1240 the control instructions. For example, the flight control module 350 of the aerial vehicle 110 may continue to allow a user with a remote controller to manually control the aerial vehicle 110.

If the vehicle determines that a collision is imminent, the vehicle overrides 1250 the control instructions. For example, the flight control module 350 may override the control instructions and stop, reverse course, or swerve to avoid a detected object.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code embodied on a machine-readable storage medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the active sensor system and associated systems. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for object detection, the method comprising:
projecting an infrared (IR) pattern from an IR emitter;
capturing a plurality of images including a first image, each image captured with a respective camera, wherein each image includes an IR channel and one or more visible channels;
detecting, in the IR channels of the captured images, a plurality of illumination features from the IR pattern, wherein the IR channel of the first image includes an illumination feature corresponding to a pattern feature of the IR pattern;
detecting one or more objects in the one or more visible channels of the images;
estimating locations for the one or more objects based on detected illumination features of the plurality of illumination features incident upon the one or more objects, wherein a location for an object upon which the illumination feature is incident is estimated based on a comparison between an angular position of the illumination feature captured by the camera and a direction that the IR emitter projected the pattern feature.

2. The method of claim 1, wherein the IR pattern is a spherical IR pattern including a plurality of longitudinal lines.

3. The method of claim 1, wherein projecting the infrared IR pattern comprises projecting two portions of the IR pattern, each projected from a respective wide angle lens.

4. The method of claim 1, wherein capturing an image with a camera includes detecting infrared light and visible light with an image sensor of the camera, the visible light coincident with the infrared light.

5. The method of claim 1 further comprising:
generating a map of objects based on the estimated locations for the one or more objects; and
generating a route for an aerial vehicle based on the map of objects.

6. The method of claim 1, wherein estimating the location for an object is based on a portion of the one or more visible channels of an image captured by a camera, wherein the portion is in an area of the image around the illumination feature.

7. The method of claim 1, further comprising:
capturing, with a first camera, a first image of the plurality of images, wherein the IR channel of the first image includes a first illumination feature;
capturing, with a second camera, a second image of the plurality of images, wherein the IR channel of the second image includes a second illumination feature;
determining that the first and second illumination feature correspond to a same pattern feature of the IR pattern, and
estimating a location for an object upon which the first and second illumination features are incident based on a comparison between respective angular positions of the first and second illumination features captured by the first and second cameras.

8. A non-transitory computer-readable storage medium storing executable computer program instructions, wherein the computer program instructions, when executed by one or more computer processors, cause the one or more computer processors to perform steps comprising:
projecting an infrared (IR) pattern from an IR emitter;
capturing a plurality of images including a first image, each image captured with a respective camera, wherein each image includes an IR channel and one or more visible channels;

detecting, in the IR channels of the captured images, a plurality of illumination features from the IR pattern, wherein the IR channel of the first image includes an illumination feature corresponding to a pattern feature of the IR pattern;

detecting one or more objects in the one or more visible channels of the images;

estimating locations for the one or more objects based on detected illumination features of the plurality of illumination features incident upon each object, wherein a location for an object upon which the illumination feature is incident is estimated based on a comparison between an angular position of the illumination feature captured by the camera and a direction that the IR emitter projected the pattern feature.

9. The non-transitory computer-readable storage medium of claim 8 wherein the IR pattern is a spherical IR pattern including a plurality of longitudinal lines.

10. The non-transitory computer-readable storage medium of claim 8, further comprising instructions for performing steps comprising:

generating a map of objects based on the estimated locations for the one or more objects; and generating a route for an aerial vehicle based on the map of objects.

11. The non-transitory computer-readable storage medium of claim 8, wherein estimating the location for an object is based on a portion of the one or more visible channels of an image, wherein the portion is in an area of the image around the illumination feature.

12. The non-transitory computer-readable storage medium of claim 8, further comprising instructions for performing steps comprising:

capturing, with a first camera, a first image of the plurality of images, wherein the IR channel of the first image includes a first illumination feature;

capturing, with a second camera, a second image of the plurality of images, wherein the IR channel of the second image includes a second illumination feature;

determining that the first and second illumination feature correspond to a same pattern feature of the IR pattern, and estimating a location for an object upon which the first and second illumination features are incident based on a comparison between respective angular positions of the first and second illumination features captured by the first and second cameras.

13. A system comprising:

an infrared (IR) emitter;

a plurality of cameras;

one or more processors for executing computer instructions that perform steps comprising:

projecting an infrared (IR) pattern from the IR emitter;

capturing a plurality of images including a first image, each image captured with a respective camera of the plurality of cameras, wherein each image includes an IR channel and one or more visible channels;

detecting, in the IR channels of the captured images, a plurality of illumination features from the IR pattern, wherein the IR channel of the first image includes an illumination feature corresponding to a pattern feature of the IR pattern;

detecting one or more objects in the one or more visible channels of the images;

estimating locations for the one or more objects based on detected illumination features of the plurality of illumination features incident upon each object, wherein a location for an object upon which the illumination feature is incident is estimated based on a comparison between an angular position of the illumination feature captured by the camera and a direction that the IR emitter projected the pattern feature.

14. The system of claim 13, wherein estimating the location for an object is based on a portion of the one or more visible channels of an image, wherein the portion is in an area of the image around the illumination feature.

15. The system of claim 13, wherein the instructions, executed by the processor, further perform steps comprising:

capturing, with a first camera, a first image of the plurality of images, wherein the IR channel of the first image includes a first illumination feature;

capturing, with a second camera, a second image of the plurality of images, wherein the IR channel of the second image includes a second illumination feature;

determining that the first and second illumination feature correspond to a same pattern feature of the IR pattern, and estimating a location for an object upon which the first and second illumination features are incident based on a comparison between respective angular positions of the first and second illumination features captured by the first and second cameras.

16. The system of claim 13, wherein the IR emitter comprises:

an IR laser to produce an IR light;

a wide-angle lens to receive the IR light and to refract the IR light to project the IR pattern.

17. The system of claim 13, wherein each of the plurality of cameras comprises a respective image sensor with a filter pattern that includes photosensors sensitive to infrared radiation and photosensors sensitive to visible light but not sensitive to infrared radiation.

* * * * *